(12) United States Patent
Freeman et al.

(10) Patent No.: US 10,380,674 B2
(45) Date of Patent: Aug. 13, 2019

(54) ELECTRONIC PALETTE SYSTEM

(71) Applicant: MOMENTUM TEXTILES, LLC, Chicago, IL (US)

(72) Inventors: Gerald Thomas Freeman, Chicago, IL (US); Tamara Davis, Chicago, IL (US)

(73) Assignee: MOMENTUM TEXTILES, LLC, Chicago, IL (US)

( * ) Notice: Subject to any disclaimer, the term of this patent is extended or adjusted under 35 U.S.C. 154(b) by 423 days.

(21) Appl. No.: 14/952,512

(22) Filed: Nov. 25, 2015

(65) Prior Publication Data

US 2016/0162983 A1 Jun. 9, 2016

Related U.S. Application Data

(63) Continuation of application No. 13/894,852, filed on May 15, 2013, now Pat. No. 9,229,621.

(60) Provisional application No. 61/688,752, filed on May 22, 2012.

(51) Int. Cl.
| | |
|---|---|
| *G06F 3/048* | (2013.01) |
| *G06Q 30/06* | (2012.01) |
| *G06F 3/0484* | (2013.01) |
| *G06F 16/00* | (2019.01) |

(Continued)

(52) U.S. Cl.
CPC ....... *G06Q 30/0643* (2013.01); *G06F 3/0484* (2013.01); *G06F 3/04842* (2013.01); *G06F 16/00* (2019.01); *G06F 16/5866* (2019.01); *G06Q 30/0621* (2013.01); *G06Q 30/0631* (2013.01); *G06Q 50/08* (2013.01)

(58) Field of Classification Search
CPC .. G06F 3/0482; G06F 3/04842; G06F 3/0484; G06F 17/5009; G06F 8/34; G06F 3/04817; G06F 3/04845; G06F 3/048; G06F 8/38; G06F 9/4443; G06F 17/211; G06F 17/2247; G06F 17/30893; G06F 3/0481; G06F 3/04847; G06F 17/30076; G06F 17/30554; G06F 17/30598; G06F 17/30908; G06F 17/50; G06F 17/5004; G06F 3/017; G06F 3/0488; G06F 3/04883
See application file for complete search history.

(56) References Cited

U.S. PATENT DOCUMENTS

| | | |
|---|---|---|
| 4,931,929 A | 6/1990 | Sherman |
| 5,293,479 A | 3/1994 | Quintero et al. |
| 5,680,333 A | 10/1997 | Jansson |

(Continued)

*Primary Examiner* — Di Xiao
(74) *Attorney, Agent, or Firm* — Polsinelli PC

(57) ABSTRACT

The present embodiments provide a system for generating design palettes over a network. In one embodiment, the system comprises a database configured to store design product data corresponding to one or more design features of a plurality of design products. A user interface is configured to allow submission of information specifying one or more requested design features. An e-palette server is in operative communication with the database and the user interface. The e-palette server is configured to receive the requested design features and to generate a subset of the design products. Each design product in the subset of the design products shares at least one design feature in common with the requested design features. An e-palette generator is configured to generate a design palette including at least one design product from the subset of design products and to send the design palette to the user interface for display.

17 Claims, 22 Drawing Sheets

(51) Int. Cl.
*G06F 16/58* (2019.01)
*G06Q 50/08* (2012.01)

(56) References Cited

U.S. PATENT DOCUMENTS

| | | | |
|---|---|---|---|
| 5,688,125 A | 11/1997 | Birdsong-Raffo | |
| 5,878,401 A | 3/1999 | Joseph | |
| 5,940,807 A | 8/1999 | Purcell | |
| 5,966,454 A | 10/1999 | Thomas et al. | |
| 5,970,471 A | 10/1999 | Hill | |
| 6,035,283 A | 3/2000 | Rofrano | |
| 6,035,305 A | 3/2000 | Strevey et al. | |
| 6,064,979 A | 5/2000 | Perkowski | |
| 6,070,149 A | 5/2000 | Tavor et al. | |
| 6,078,922 A | 6/2000 | Johnson et al. | |
| 6,105,003 A | 8/2000 | Morohashi et al. | |
| 6,128,600 A | 10/2000 | Imamura et al. | |
| 6,377,937 B1 | 4/2002 | Paskowitz | |
| 6,381,510 B1 | 4/2002 | Amidhozour et al. | |
| 6,563,510 B1 | 5/2003 | Rice et al. | |
| 6,625,619 B1 | 9/2003 | McClendon et al. | |
| 6,813,610 B1 | 11/2004 | Bienias | |
| 6,970,840 B1 | 11/2005 | Yu et al. | |
| 7,062,722 B1 | 6/2006 | Carlin et al. | |
| 7,080,080 B1 | 7/2006 | Miller | |
| 7,136,790 B1 | 11/2006 | Hobbs et al. | |
| 7,216,092 B1 | 5/2007 | Weber et al. | |
| 7,249,063 B2 | 7/2007 | McMullen et al. | |
| 7,487,117 B1 | 2/2009 | Tamura et al. | |
| 7,661,958 B2 | 2/2010 | Meyer et al. | |
| 8,290,801 B1 | 10/2012 | Roach, Jr. et al. | |
| 8,473,470 B1 | 6/2013 | Cook, Jr. et al. | |
| 9,348,844 B2 | 5/2016 | Gershon et al. | |
| 9,552,144 B2 * | 1/2017 | Negrillo | G06F 3/0481 |
| 2001/0032062 A1 | 10/2001 | Plaskoff et al. | |
| 2001/0047250 A1 | 11/2001 | Schuller et al. | |
| 2002/0006602 A1 | 1/2002 | Masters | |
| 2002/0030689 A1 | 3/2002 | Eichel et al. | |
| 2002/0073114 A1 | 6/2002 | Nicastro et al. | |
| 2002/0077930 A1 | 6/2002 | Trubey et al. | |
| 2002/0093538 A1 | 7/2002 | Carlin | |
| 2002/0099617 A1 | 7/2002 | Fogelson | |
| 2002/0099725 A1 | 7/2002 | Gordon | |
| 2002/0156757 A1 | 10/2002 | Brown | |
| 2002/0184111 A1 | 12/2002 | Swanson | |
| 2002/0184232 A1 | 12/2002 | Menner et al. | |
| 2002/0188526 A1 | 12/2002 | Muneishi et al. | |
| 2003/0061122 A1 | 3/2003 | Berkowitz et al. | |
| 2003/0063126 A1 | 4/2003 | Yanchar et al. | |
| 2003/0151611 A1 | 8/2003 | Turpin et al. | |
| 2003/0216972 A1 | 11/2003 | Gotou et al. | |
| 2004/0078299 A1 | 4/2004 | Down-Logan et al. | |
| 2005/0149411 A1 | 7/2005 | Colwell | |
| 2006/0085277 A1 | 4/2006 | Arnston | |
| 2006/0100889 A1 | 5/2006 | Gosko | |
| 2006/0111878 A1 | 5/2006 | Pendyala et al. | |
| 2006/0136180 A1 * | 6/2006 | Hansen | G06F 17/50 703/1 |
| 2006/0185275 A1 | 8/2006 | Yatt | |
| 2007/0055628 A1 | 3/2007 | Blagg et al. | |
| 2007/0111178 A1 | 5/2007 | Riley | |
| 2007/0136031 A1 | 6/2007 | Feldman et al. | |
| 2007/0298382 A1 * | 12/2007 | Schilling | G09F 5/04 434/75 |
| 2008/0109330 A1 | 5/2008 | Torres | |
| 2008/0162305 A1 | 7/2008 | Rousso et al. | |
| 2009/0160856 A1 * | 6/2009 | Hoguet | G06Q 10/06 345/420 |
| 2010/0185547 A1 | 7/2010 | Scholar | |
| 2010/0198563 A1 * | 8/2010 | Plewe | G06F 17/5004 703/1 |
| 2011/0018896 A1 * | 1/2011 | Buzyn | G06F 3/0481 345/594 |
| 2011/0029401 A1 | 2/2011 | Granger et al. | |
| 2011/0045453 A1 | 2/2011 | Bender et al. | |
| 2011/0061011 A1 | 3/2011 | Hoguet | |
| 2011/0078028 A1 * | 3/2011 | Glynias | G06Q 30/0277 705/14.73 |
| 2011/0093361 A1 | 4/2011 | Morales | |
| 2012/0231424 A1 | 9/2012 | Calman et al. | |
| 2013/0018850 A1 | 1/2013 | Houlihan et al. | |
| 2013/0109002 A1 | 5/2013 | Howard et al. | |
| 2013/0110720 A1 | 5/2013 | Rekhi et al. | |
| 2013/0184847 A1 * | 7/2013 | Fruh | G05B 19/41875 700/109 |
| 2013/0268416 A1 * | 10/2013 | Sandow | G06Q 10/0833 705/28 |
| 2014/0032362 A1 | 1/2014 | Frayman | |
| 2014/0214368 A1 | 7/2014 | Loberg | |
| 2014/0278697 A1 | 9/2014 | Thornberry et al. | |
| 2014/0279249 A1 | 9/2014 | Westphal | |
| 2014/0298230 A1 | 10/2014 | Priest | |
| 2014/0304661 A1 | 10/2014 | Topakas et al. | |
| 2015/0012454 A1 | 1/2015 | Kapoor | |
| 2015/0186886 A1 | 7/2015 | Schwalb et al. | |
| 2015/0186967 A1 | 7/2015 | Madawala et al. | |
| 2015/0235389 A1 | 8/2015 | Miller et al. | |
| 2015/0379005 A1 | 12/2015 | Dorner et al. | |

* cited by examiner

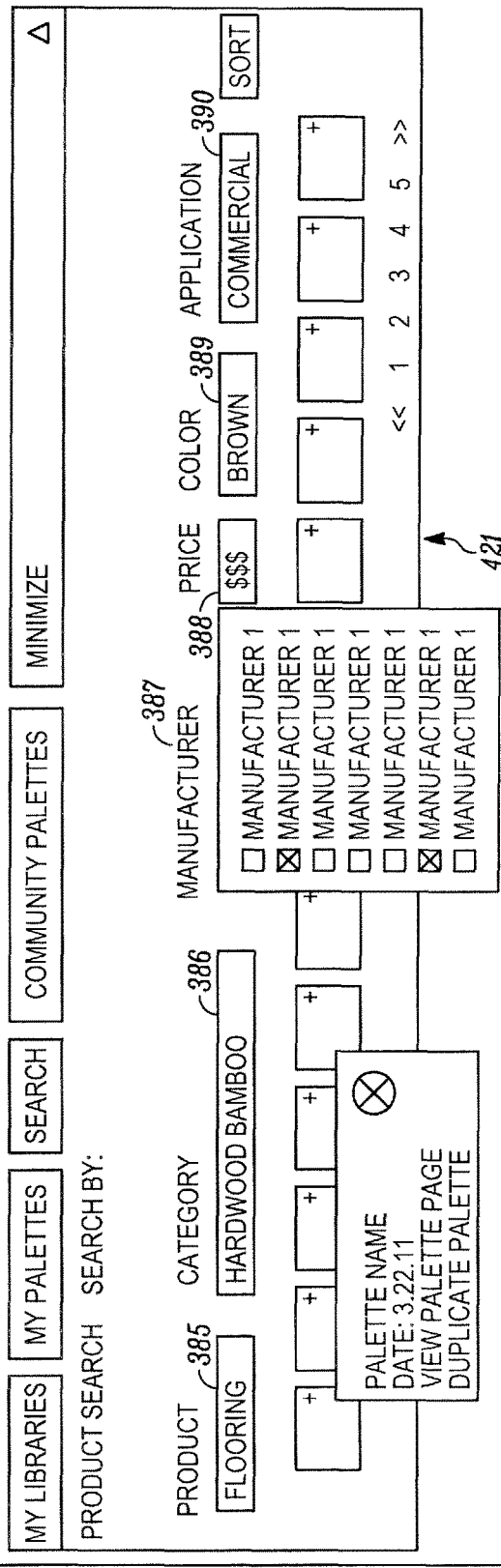

ELECTRONIC PALETTE SYSTEM

The present patent document is a continuation application that claims the benefit of priority under 35 U.S.C. § 120 of U.S. patent application Ser. No. 13/894,852, filed May 15, 2013, which claims priority to U.S. Provisional Application Ser. No. 61/688,752, filed May 22, 2012, each of which is incorporated herein by reference in its entirety. This invention relates to a system for accomplishing interior and exterior design. In particular, the invention relates to electronic design palettes created by via a website or tablet app. The ability to order multiple samples, project binder, specification sheets, warranty sheets, maintenance sheets, installation instructions and MSDS sheets with one click.

FIELD

SUMMARY

In the interior design industry, designers and architects often have to create interior design palettes that include one or more combinations of different product samples (e.g., carpet, flooring, fabric, plastic, laminate, etc.) that will be used to decorate an interior or exterior space (e.g., office, apartment, building, etc.). These design palettes are presented to client and potential clients during a sales pitch and are a very important part of the interior design business. Currently, these design palettes are created by manually reviewing hundreds or even thousands of product samples from different manufacturers, or browsing the websites of these product manufacturers in order to select a product. Then, physical product samples are collected and presented to the client. This is a very difficult process that takes many hours of the designer's time. In addition, this process is further extended by the fact that a designer or architect often must order separate product samples from different manufacturers. Ordering is generally performed by either calling the various selected manufacturers or completing an order form on the manufacturer's website.

Therefore, there is a need for an improved system for creating design palettes and ordering product samples. The electronic system described here allows designers and architects to quickly evaluate products from hundreds of manufacturers using a website that includes a filtering feature that searches and sorts products according to inputted project requirements. This system allows users to create and manage their palettes online, via web browsers. The system further allows manufacturers to submit and manage their products and also acts as a forum for all users (e.g., designers, manufacturers, students, etc.) to interact with other users and exchange opinions about different products.

The system further permits users to modify a created palette, compare palettes, or just to save information about products that they would like use in a current or future project. Each created electronic palette (or e-palette) can be shared with other users (e.g., via email or social media), printed, or downloaded to a user's computer. The system allows a designer or an architect to work on multiple palettes at one time. Further, the system allows a designer or an architect to order multiple physical samples of all of the products in their palette(s) or download all of the specification sheets, warranty sheets, maintenance sheets, installation instructions and MSDS sheets at one time or create a project binder. Therefore, this proposed system will save the architect or the designer hundreds of hours per year over the traditional process of going through a physical library of products and sorting by hand through thousands of products, and then having to separately order each sample of the products that they want.

Other embodiments and aspects of the invention will become apparent by consideration of the detailed description and accompanying drawings.

DETAILED DESCRIPTION

Figure 1:
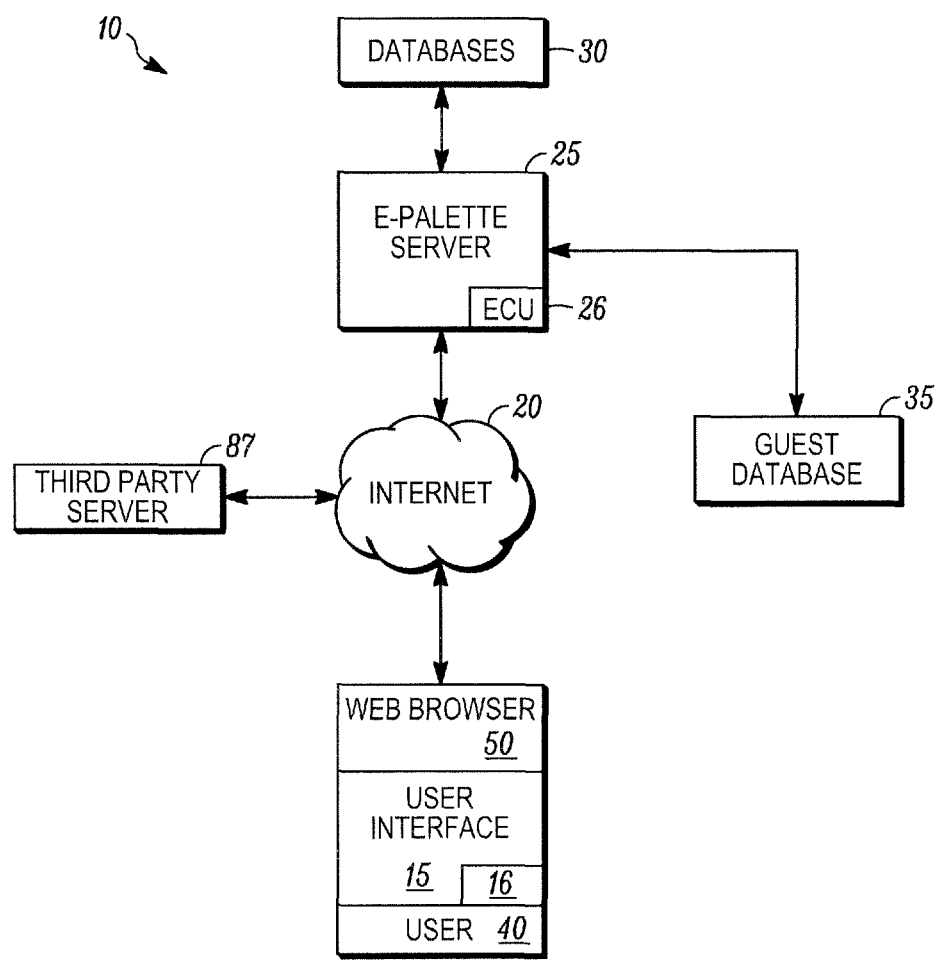
FIG. 1 depicts a schematic illustration of a system for generating electronic palettes according to embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways and by various industries.

The systems shown in the figures are models of what actual systems might be like. It should also be noted that a plurality of hardware and software based devices, as well as a plurality of different structural components, may be utilized to implement the invention. Many of the modules and logical structures described are capable of being implemented in software executed by a microprocessor or a similar device or being implemented in hardware using a variety of components. As described in subsequent paragraphs, the specific configurations illustrated in the drawings are intended to exemplify embodiments of the invention, and other alternative configurations are possible. Furthermore, throughout the specification capitalized terms are used. Such terms are used to conform to common practices and to help correlate the description with the coding examples, equations, and/or drawings. However, no specific meaning is implied or should be inferred simply due to the use of capitalization.

FIG. 1 depicts an electronic palette generation system 10 including a user interface 15, the Internet 20, and an e-palette server 25. The server 25 is coupled to databases 30 and, in some embodiments, to a guest database 35. The server 25 includes an Electronic Control Unit (ECU) 26 that controls the operation of the server 25 and the system 10. In some systems, the components of FIG. 1 are coupled via one or more networks, such as a local area network, wide area network, cellular network, and/or other types of networks, in addition to or in place of the Internet 20.

The user interface 15 can be a computer, a personal digital assistant ("PDA"), a tablet computer, a telephone, or any other device that allows a user 40 to connect to the server 25 via the Internet 20 or any other communication network. The user interface 15 includes a controller 16 (e.g., a processor of a computer) that communicates with the ECU 26 of the server 25 and with other user interfaces. Several types of users 40 can access the server 25. In some embodiments, the users 40 include a designer (that generally uses the system 10 to create a palette 45), a product manufacturer, manufacturer rep or vendor (that provides products to be included in the palette 45), and a system administrator (that supports the server 25 and the system 10). As explained in further details below, a designer user can include an interior designer, an architect, a student, or any other type of designer user.

At a high-level, one method of operation of the system 10 includes a product manufacturer at a user interface 15 inputting information about product sold by that manufacturer (i.e., various products to be included in a palette) to the server 25 via a web browser 50 and the Internet 20. A designer user uses a different user interface 15 to connect to the server 25 via a web browser 50, to access at least one of the databases 30, to search for and sort various products offered by different manufacturers, and to create an e-palette 45 that includes the provided palette information (e.g., various design products). A designer user can save the created palette 45 (see FIG. 7), can request a sample of all products for one or more palettes 45, and can download a specification sheet for every product included in the e-palette 45' or create a project binder 190 that could include the following documents; cover page 191, index 192, product page 193, specification sheet 194, installation sheet 195, maintenance sheet 196, warranty sheet 197, material safety data sheet 98 for all products included in the e-palette (see FIG. 9). In addition, the created e-palette 45 can be sent to the user computer 15 (e.g., via email or social media) or downloaded to the user computer 15 and locally saved on the computer.

Figure 2:
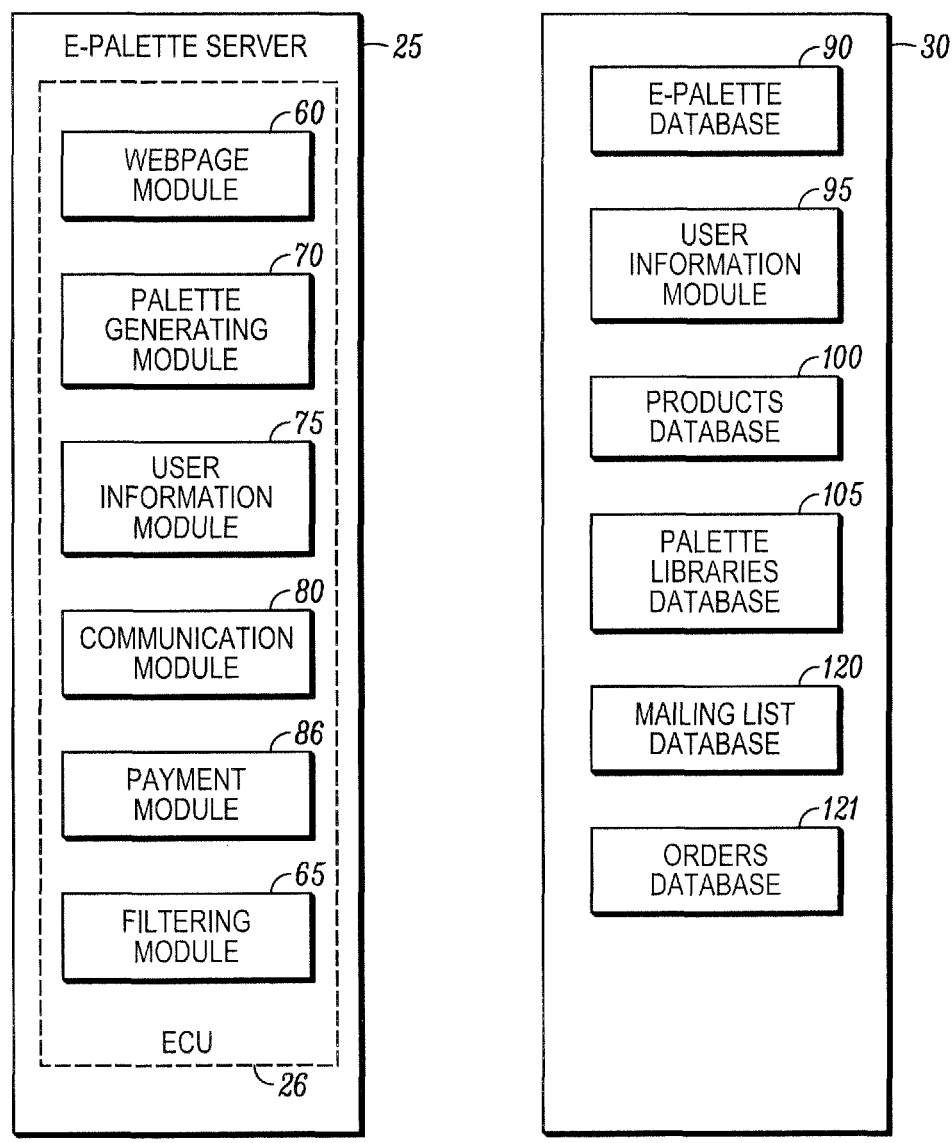
FIG. 2 illustrates an electronic palette server and databases for use with the system for generating the electronic palette of FIG. 1.

FIG. 2 depicts the server 25 and databases 30 in more detail. The ECU 26 of the server 25 includes various modules 56 that control the operation of the server 25 and the system 10. The ECU 26 is a microcontroller that includes (or is connected to) memory (not shown) such as RAM and ROM and executes software that can be stored in the RAM (particularly during execution), the ROM (on a generally permanent basis), or another non-transitory computer readable medium, such as other memory or a disc. If necessary, the microcontroller can be connected to such memory or a disc drive to read such software. The ECU 26 may be implemented as a microprocessor or other programmable device (e.g., a field programmable gate array (FPGA), an application specific integrated circuit (ASIC), or the like) with suitable memory and I/O devices. The modules 56 are created in any suitable software development language and on any type of platform by using the system's proprietary application program interface. Examples of suitable software languages include, but are not limited to, Visual Basic, Java, Adobe Flex, Adobe Flash, and HTML. Examples of platforms include, but are not limited to, Windows™, UNIX™, Linux™, and Google™.

In one embodiment, the server 25 includes a webpage module 60, filtering module 65, palette generating module 70, user information module 75, communication module 80, and payment module 86. In some embodiments, one or more of the modules or a portion thereof are located on a third party server 87. In other embodiments, the server 25 can include more or less modules.

The webpage module 60 generates webpage data for output to the web browser 50. For instance, the web browser 50 receives webpage data generated by webpage module 60 and displays the webpage data on a user interface 15. In some implementations, a portion of the webpage data is stored locally at user interface 15 from previous webpage data transfers and, therefore, an updated portion of webpage data is sent from server 25 to complement or overwrite the webpage data already stored on the user interface 15. Generally, at least a portion of the webpage data is generated "on-the-fly" after a user request. For instance, the webpage data may be customized to a particular user and/or date before being output to the web browser 50.

The filtering module 65 filters the different products included in the databases 30 based on a specific user input. In some systems, the user inputs specific filtering characteristics (e.g., job size (square feet), type of use (commercial/residential), budget, primary color, carpet backing, etc.) into a filter in order to generate results directed towards a specific project. The filtering module 65 filters the data stored into the databases 30 based on the directed input and displays products that fall within or satisfy the selected criteria. From the filtered product results, the user selects specific products and the system generates one or more e-palettes 45 for a particular project.

The user information module 75 collects, analyzes, verifies, and stores user information. For instance, user information module 75 is operable to store user login and password information, as well as account information, in the user information database 95. The user information module 75 compares user-entered login and password information from the web browser 50 with the stored information to verify the identity of a user at user interface 15. The user information module 75 is also operable to store user-entered preferences and to analyze user selection information. Through analysis of multiple palettes created by a particular user, the user information module 75 identifies selection trends of the user to generate selection suggestions. For instance, if a user 40 orders a sample product from a specific manufacturer, the user information module 75 is operable to store the manufacturer name and/or the product characteristics thereof, and later cause the server 25 to suggest another product of the same manufacturer or similar to the previously ordered product.

The communication module 80 allows users to communicate with other users in the system 10. Users can send messages to other users and can also communicate with nonusers, for example, to send a referral to a nonuser to join the system 10. The communication module 80 further allows manufacturer users to upload their products on the products database 100 located on the server 25. In addition, the communication module 80 allows the system administrator to communicate with all other users (e.g., to confirm registration, send requested data, etc.). In another embodiment, users can interact directly with other users via communication module 80. For example, users can use the system as a forum, ask questions, share ideas, news or comments regarding content, products, or created e-palettes.

The payment module 86 is configured to process users' payments. For instance, the payment module 86 receives user payment information (e.g., credit card information) entered by the user via web browser 50. In some embodiments, users pay a monthly subscription to the owner of the e-palette generation system 10. In addition, some users (e.g., student users) can use the system 10 free of charge. The payment module 86 interacts with the third party server 87 (e.g., a credit card company server) to complete the transaction. For example, the payment module 86 is configured to operate in connection with an existing payment processing system (e.g., PayPal™, Google Checkout™, etc.) that processes payments from a user. Thereafter, a confirmation is sent to the web browser 50 to indicate to the user that the transaction completed. In addition, the payment module 86 is configured to automatically process the user's monthly subscription to the system 10.

The databases 30 include the e-palette database 90, user information database 95, a products database 100, palette libraries database 105, mailing list database 120, and orders database 121. The databases 30 are coupled to the server 25 via a data link. In some systems the data link is a direct wired or wireless coupling. In other embodiments, the data link is a local network connection, which can include wired and wireless connections. In still other systems, the server 25 is connected to the databases 30 using a non-local network, such as a wide area network, a cellular network, or the Internet 20 (an embodiment not depicted in FIG. 1). This embodiment may also include local network connections between the server 25 and databases 30. Each of the databases within databases 30 includes an addressable memory, such as a hard disc or other medium able to store and retrieve digital information. In some embodiments, all or a portion of the databases within databases 30 are stored in a single memory device. The databases 30 also include software for storing received data, searching stored data, receiving data requests, retrieving the requested data, and outputting the data to the requester or other appropriate recipient.

In some embodiments, some or all of the databases 30 are integrated with the server 25. In other embodiments, individual databases within databases 30 are divided into multiple sub-databases that may be located in different locations and coupled together or to the server 25 using various networks and devices. In some implementations, the server 25 is one or more of an Xserve server offered by Apple, a PowerEdge server offered by Dell, a System x or BladeCenter server offered by IBM, Blade server offered by Oracle, or the like. In some implementations, the databases 30 are maintained by database software such as Microsoft SQL Server, Oracle Database, IBM DB2, or the like.

The e-palette database 90 includes e-palette templates that are used to form e-palettes by the e-palette generating module 70. The e-palette templates may include multiple choices for each customizable element and multiple combinations of elements. For example, one e-palette template includes the following elements/products: 2-3 carpet options (main carpet, office carpet and conference room carpet); 2-3 paint options (wall color, trim color and ceiling color); 2 plastic laminate samples for pantry/coffee/copy cabinets; 1-2 wood samples (flooring, wall panels, furniture); 1 glass sample; 1 latch-set for door hardware; 4-6 fabrics (furniture, walls, panels); 1 ceramic (bathroom or kitchen tiles); 1-2 vet samples (pantry/coffee/copy); 1 rubber sample; 1 marble or granite sample for lobbies; and 1-2 wall-covering samples. The e-palette template can include more or less elements/products. In other implementations, users are able to create their own e-palette templates and, via server 25, store the templates in the e-palette database 90.

The products database 100 includes products from various manufacturers that are used to create an e-palette 45. Manufacturer users store their own products information within the products database 100. For instance, a user is able to create a new product entry on the system for every new product that is to be presented on the system 10. The user specifies the type of product (e.g., carpet, paint, etc.), captures or creates a media (e.g., photo of a product, specification sheet, etc.) using user equipment (e.g., a computer, camera, sophisticated software, etc.), then uploads the product information including the media to the products database 100. All new products are included in a "New Products" section and need to be approved by a system administrator before they are accessible to other users.

The palette libraries database 105 includes e-palettes 45 that are created and saved by existing users 40. As explained in more detail below, after a user is registered, the user 40 can create and save one or more palettes 45 on the system 10. The user 40 can access these saved palettes at any time and delete them if he or she wishes to do so. In some embodiments, the palette libraries database 105 is indexable using a date. For instance, after a e-palette 45 is created, the e-palette 45 is saved on the palette libraries database 105 and is associated with a save and/or modified date. A user 40 can later access the system 10 and can view and sort his exiting palettes by the date characteristics associated with the palettes.

In some embodiments, e-palette database 90, products database 100, and palette libraries database 105 also store usage data related to other databases such as the quantity and/or frequency of previews of a product or e-palette template. This usage data is stored in a separate usage database (not shown), or within each respective database, or a combination thereof. Additionally, in some embodiments, the e-palette database 90, products database 100, and palette libraries database 105 store text such as tag or description data. The tag or description data provides additional text data for use in searching the databases.

Figure 3:
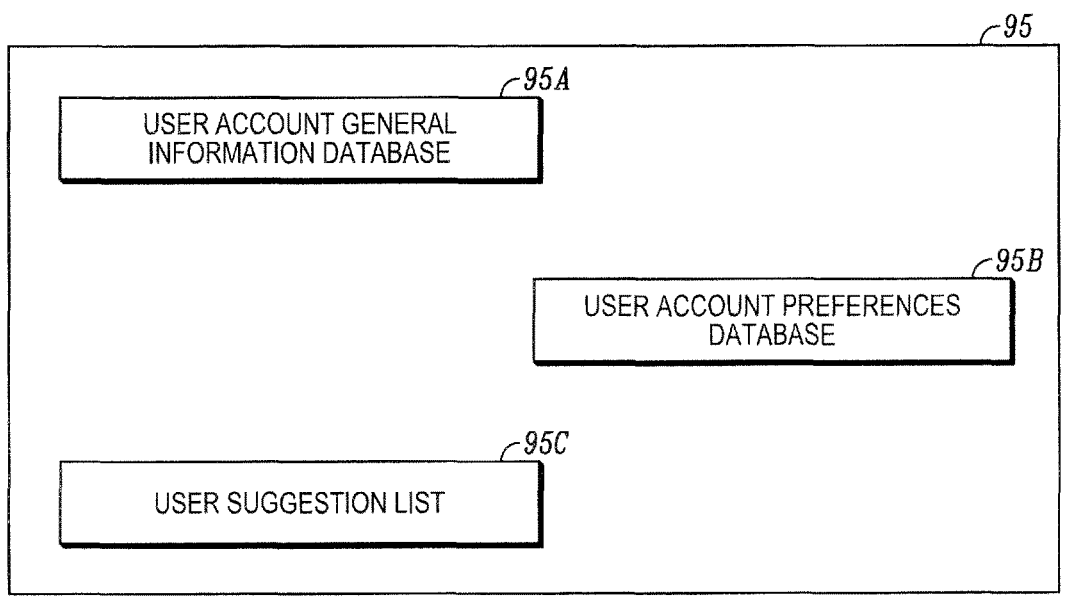
FIG. 3 further illustrates an exemplary database of FIG. 2.

As shown in FIG. 3, the user information database 95 includes three sub-databases: user account general information database 95a, user account preferences database 95b, and user suggestion list 95c. Although the databases 95a-c are depicted as separate, in some embodiments, one or more of the sub-databases 95a-c are combined into a single database. In other embodiments, databases 95a-c are divided into more databases.

User account general information database 95a includes a user name, user login, user password, user payment information (e.g., credit card information), and user account type information (e.g., designer, manufacturer, etc.). The server 25, and in particular, the user information module 75, verifies user login and password information using the user account general information database 95a. The user account general information database 95a further stores user address, email address, phone number, and/or fax number that every user is required to input when creating an account. The user account type information includes the information about the type of user 40: designer user (that includes commercial or residential architect or designer), manufacturer user, student user, and any other type of user. Generally, a user 40 provides this information when registering for the first time with the system 10. A user 40 can update and/or change information by using the user interface 15 and that change will be saved in the user account general information database 95*a*.

The user account preferences database 95*b* stores information about the types of products in which the user is interested. In some embodiments, the user account preferences database 95*b* includes data from the libraries created by each user. In other embodiments of the invention, additional user preferences are stored. For example, the type of manufacturer is included. In some implementations, the user account preferences database 95*b* is populated by the user, via the user information module 75 based on past viewed and/or selected products, browsing records, or other methods, or a combination thereof.

The data stored within the user suggestions list 95*c* includes one or more of e-palettes, products, and manufacturers associated with previous user activity on the website or user information otherwise obtained. Some information stored within the user suggestions list 95*c* may overlap or closely relate with information stored in user account preferences database 95*b*. Based on a user's prior selection of a product including, e.g., beige carpet X by company ABC, carpets Y and Z also by company ABC would be added to the user suggestions list 95*c* for suggestion during future e-palette creation by the same user. Suggested e-palette templates and manufacturers are similarly added to the user suggestions list 95*c* based on their inclusion within or similarity to a user's earlier website browsing or e-palette.

In some implementations, the server 25 generates emails for a particular user based on the information within the user suggestions list 95*c*. For instance, if a new product created by company ABC is uploaded by ABC to the server 25, the server is operable to generate and send an email or text message to another user informing that user of this information. Additionally, links to additional information, more products by this manufacturer, and/or a link to the manufacturer's website may be provided within the email. In some implementations, the product manufacturer pays a fee for such an informational email to be sent to one or more users that are associated with the manufacturer via the user suggestions list 95*c*.

The mailing list database 120 includes website-maintained address lists 125. The address lists 125 include at least one of email addresses and physical mailing addresses. In one implementation, the website maintained address lists 125 include address lists stored in the mailing list database 120 by website authorized personnel, such as the system administrator. In other implementations, the website maintained address lists 125 include one or more lists of addresses that are provided by users when they register to the website. These lists with addresses are used by the system 10 to inform a manufacturer where to ship a requested product sample. For example, after a user creates a palette 45 and requests a sample of the products in the palette, the system 10 sends a sample delivery request to each manufacturer. The sample delivery request includes information about the product and the shipping address of the requesting party. In addition, the address lists stored in the mailing list database 120 are used to send invoices to manufacturers.

In another embodiment, when a user 40 saves a product, the manufacturer is notified that someone has viewed and saved one of their products. If the manufacturer wants to receive details about who saved their products and perhaps pays a particular fee, the manufacturer receives an email from the system with the information about the user that saved their product. The transaction is handled by the payment module 86 similar to other e-palette transactions.

Figure 4:
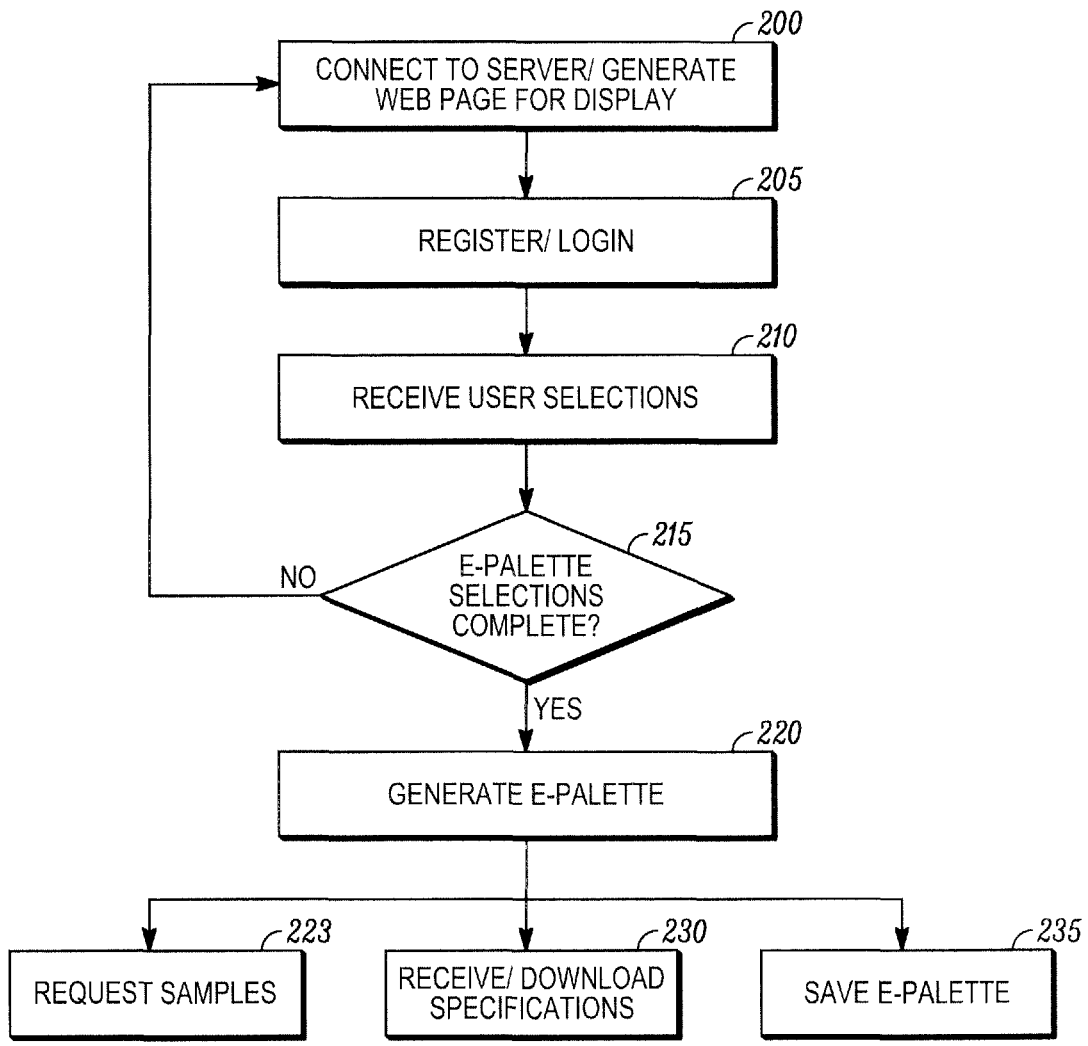
FIG. 4 depicts a method for generating an exemplary electronic palette according to embodiments of the invention.
Figure 5A:
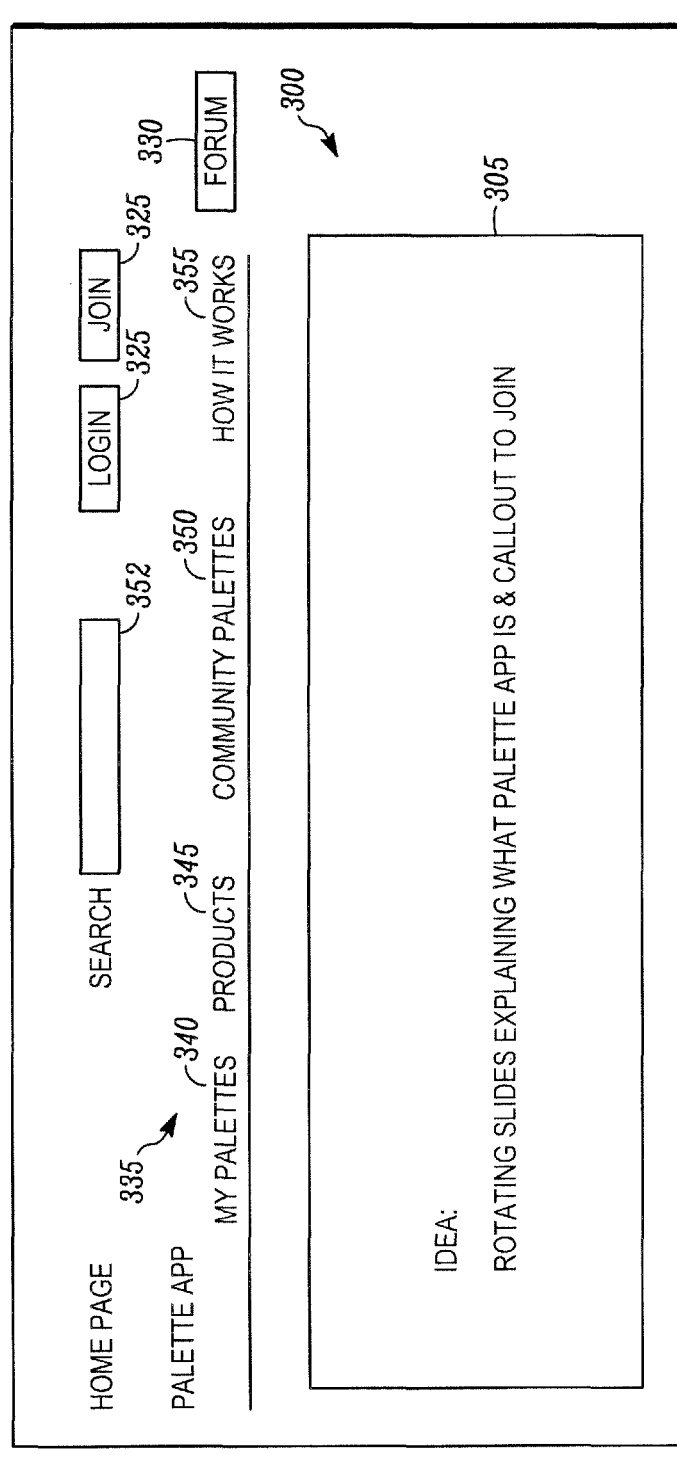
FIGS. 5 and 6a-g illustrate webpages of an exemplary electronic palette website generated by the server of FIG. 2, where due to size constraints it is noted that FIG. 5 begins at FIG. 5A and continues on a separate sheet at FIG. 5B, while FIG. 6A begins at FIG. 6AA and continues on a separate sheet at FIG. 6AB, while FIG. 6B begins at FIG. 6BA and continues on a separate sheet at FIG. 6BB, while FIG. 6C begins at FIG. 6CA and continues on a separate sheet at FIG. 6CB, while FIG. 6D begins at FIG. 6DA and continues on a separate sheet at FIG. 6DB, while FIG. 6E begins at FIG. 6EA and continues on a separate sheet at FIG. 6EB, while FIG. 6F begins at FIG. 6FA and continues on a separate sheet at FIG. 6FB, while FIG. 6G begins at FIG. 6GA and continues on a separate sheet at FIG. 6GB.
Figure 5B:
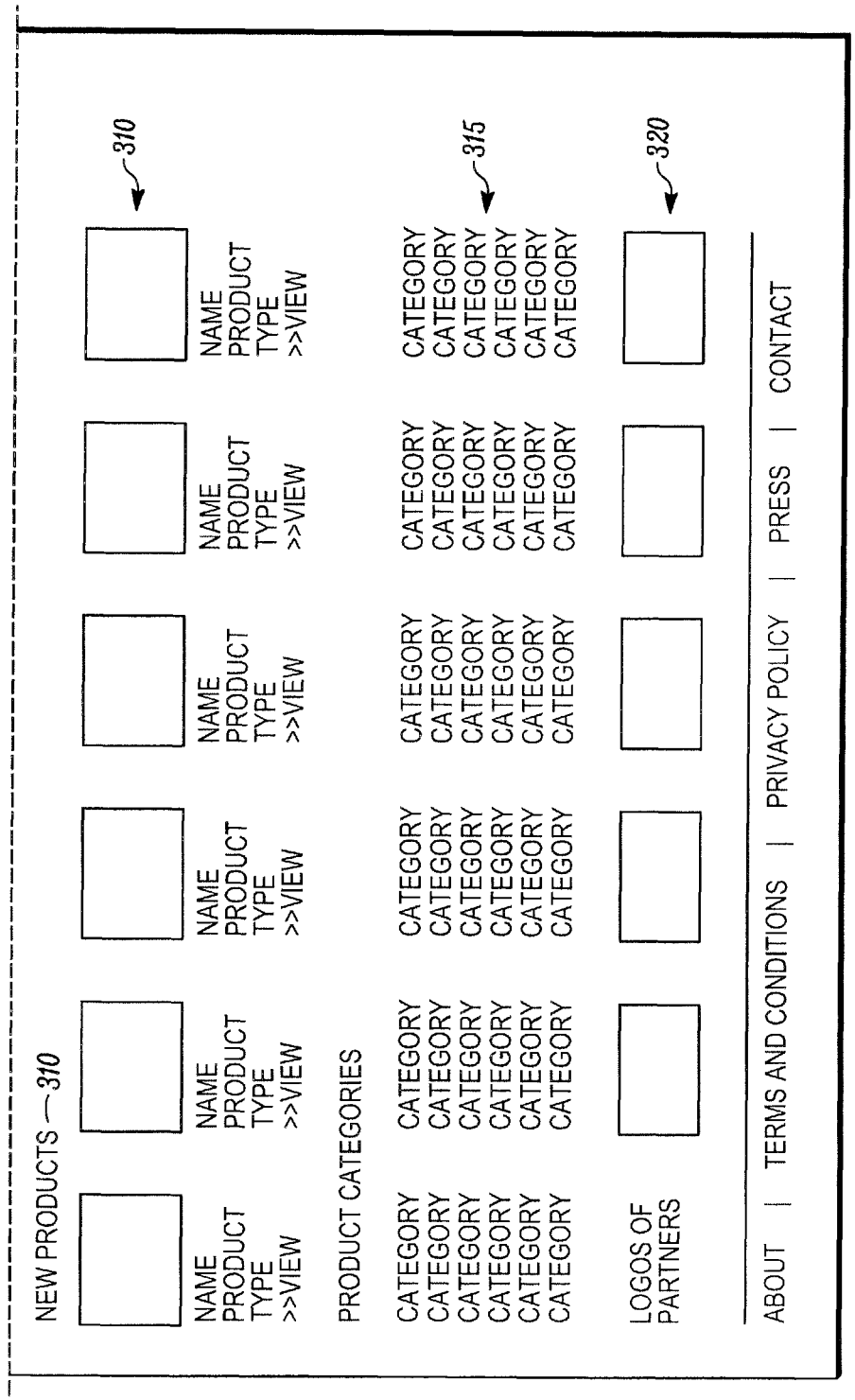

FIG. 4 depicts a method of generating an e-palette according to embodiments of the invention. In step 200, the user 40 connects to the server 25. In one instance, the server 25, in particular, the webpage module 60 generates webpage data for display in a web browser 50. The webpage data is sent to the user's web browser, for instance, over the Internet 20. Once received, the webpage data is displayed in the web browser 50, and at step 205, an exemplary home page (FIG. 5) is displayed in the web browser 50 based on the webpage data generated. In step 205, a user 40 creates an account or logs in into an existing account. To search products, create e-palettes, and order samples of products, a user 40 must be registered with the website. In some embodiments, a visiting user is able to search and view products but he will not be able to create an e-palette or request product samples unless he or she is registered.

In step 210, the user inputs information via the user interface 15 to the server 25. The user interacts with the server 25 via the web browser 50 and the server responds to the user-entered information and outputs updated webpage data accordingly. The information entered by the user 40 may include selection information (e.g., selection of an e-palette template), commands (e.g., search products, generate e-palette), and/or user information (e.g., login, password, or information for user information database 95). This interaction between the user, user interface 15, and server 25 is commonly referred to as "browsing." Browsing the c-palette website refers to the webpage data collectively generated, stored, and output by the server 25. Browsing includes, among other things, logging into the website, creating e-palettes, browsing e-palettes, browsing products, and browsing manufacturers. Steps 200 and 210 are repeated during this browsing period until, in step 215, the server 25 receives the information necessary to generate an e-palette.

In step 220, the server 25, in particular, the e-palette generating module 70, generates an e-palette 45 based on the user information entered. After the e-palette is generated, depending on the embodiment of the invention and the particular e-palette generated, the user 40 may request a sample of every product in the created e-palette (step 223). In that embodiment, a product manufacturer may be charged a fee for every sample product ordered through the website. The server 25, in particular, the payment module 86, carries out the purchase transaction. In an alternative embodiment, a user 40 can download or receive a specification sheet (e.g., a PDF file) for every product on the created e-palette. Thus, in step 230, a PDF file including the product's specification sheets is sent by the server 25 to one of the recipient interfaces 15 or the user's email on file. In yet another embodiment, in step 235, the user 40 can save his or her e-palette and product selections (e.g., into the user's libraries) without requesting samples and/or specifications sheets.

As mentioned above, FIG. 5 depicts web browser 50 with one exemplary layout of the e-palette website homepage 300. The homepage 300 includes an information section 305 (i.e., used to explain the general idea of the website), new products section 310, products categories section 315, and a partner's logos section 320 (e.g., sponsoring partners). Further, the homepage 300 includes a login/join section 325, a forum section 330, and a toolbar section 335. In some implementations, after a user 40 logs on to the website using login section 325, which interacts with the server 25 to verify the user's identity as described above, the components of the website are updated with customized webpage data. In some implementations, cookies stored on the user interface 15 from a previous webpage visit are automatically used by the server 25 to verify the user's identity without requiring login actions. In other implementations, a user is also able to browse without logging on to the website.

In one embodiment, a user chooses a browsing option by selecting one of the following buttons in the toolbar section 335: my palettes 340, products 345, community palettes 350, my libraries 351, search 352, how it works 355, and social 356. In alternative embodiments, the toolbar section 335 can include more or less buttons. If a user selects the search button 352, the user will interact with the e-palette website to view various products by different manufacturers. FIGS. 7a-g illustrate a portion of the various webpages used to search products in the website and to create an e-palette.

Figure 6A:
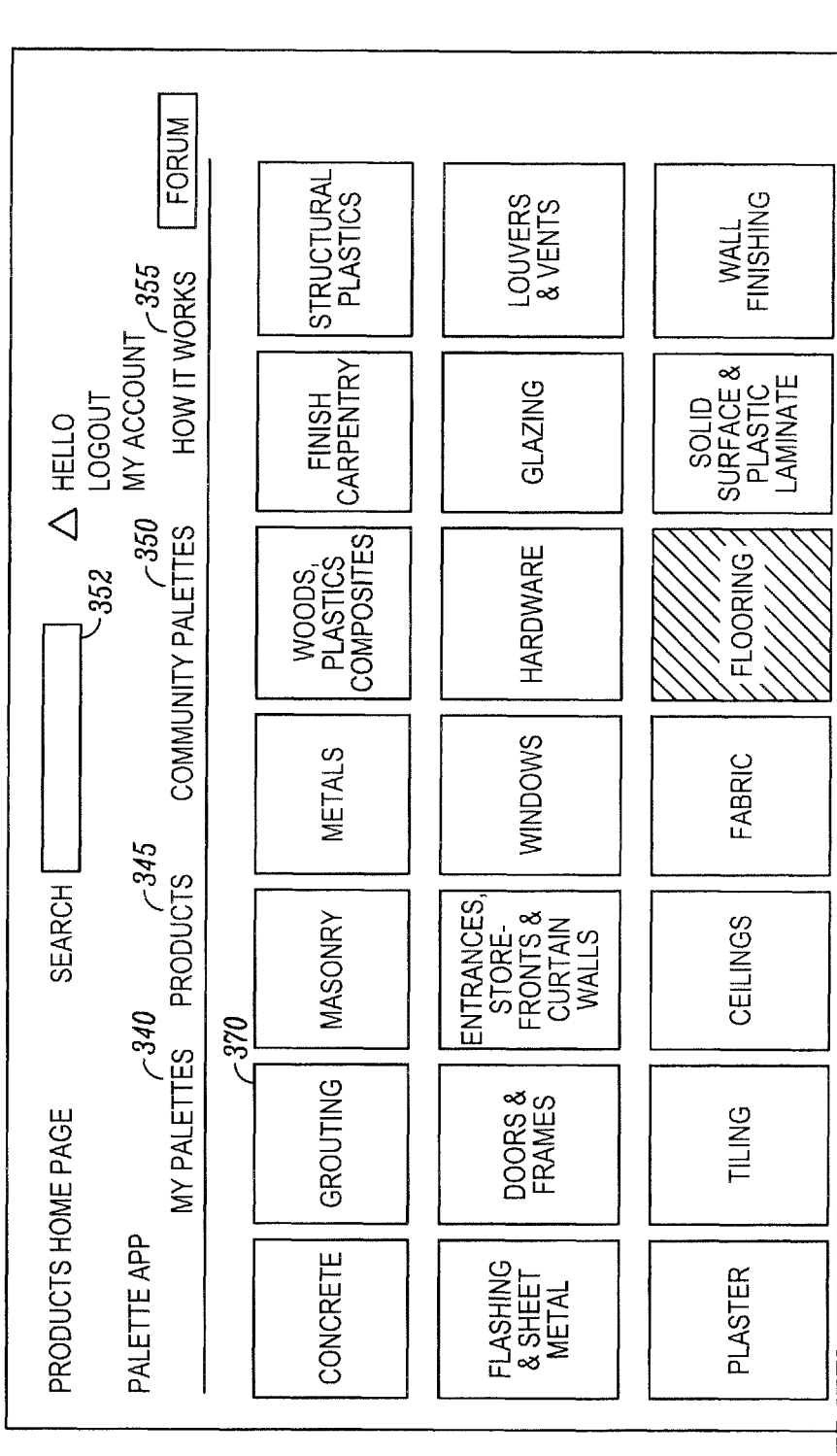
Figure 6A:
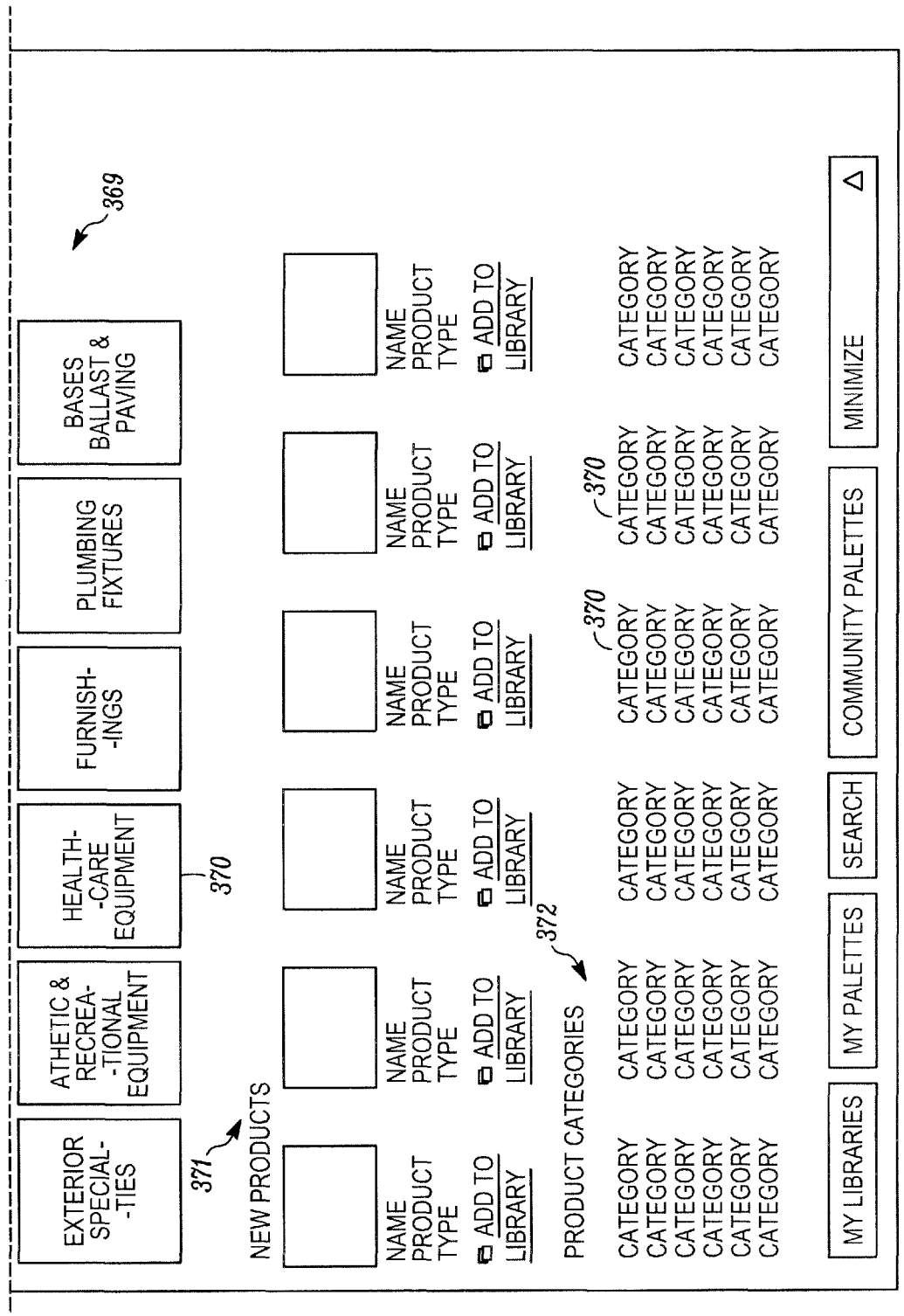
Figure 6B:
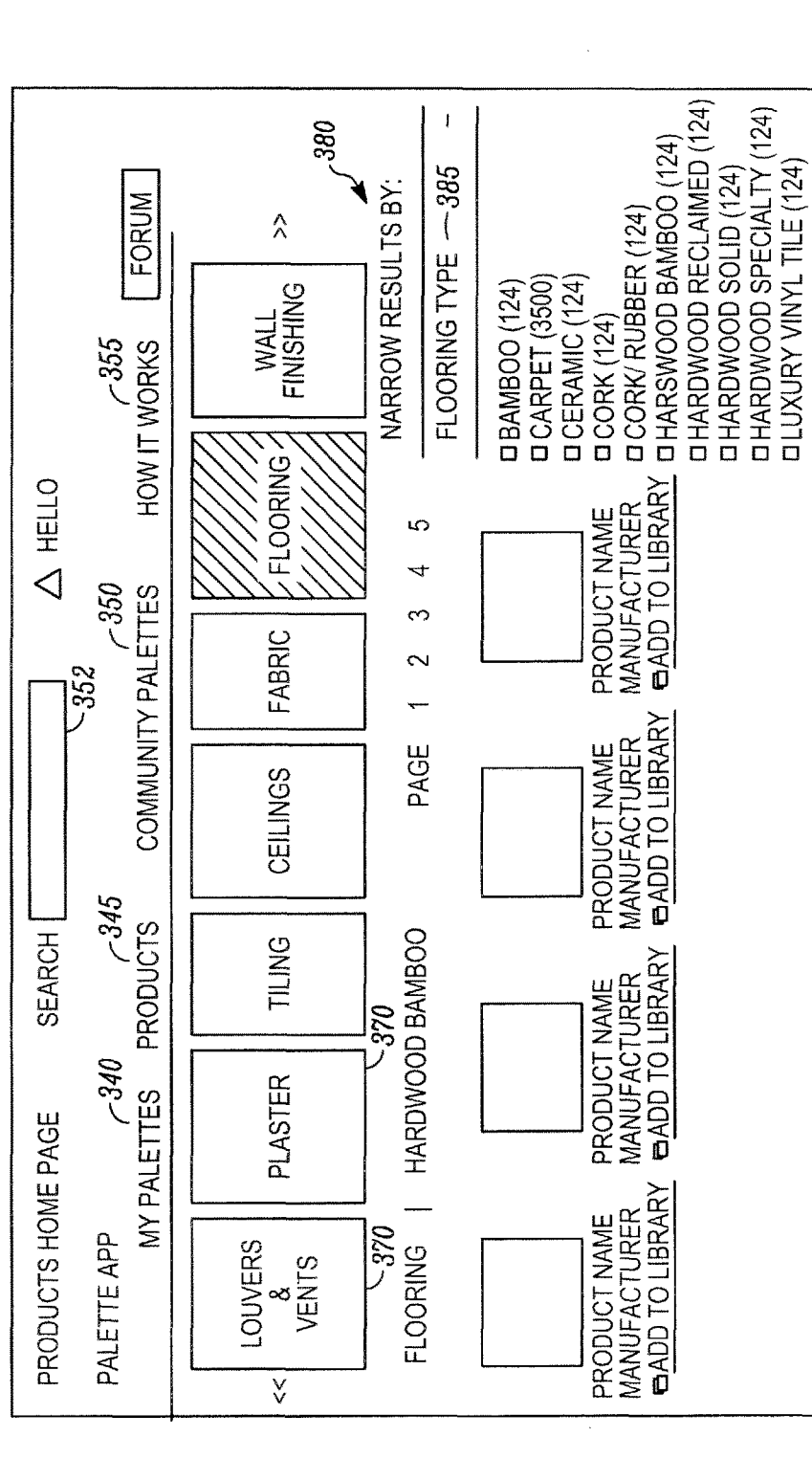
Figure 6B:
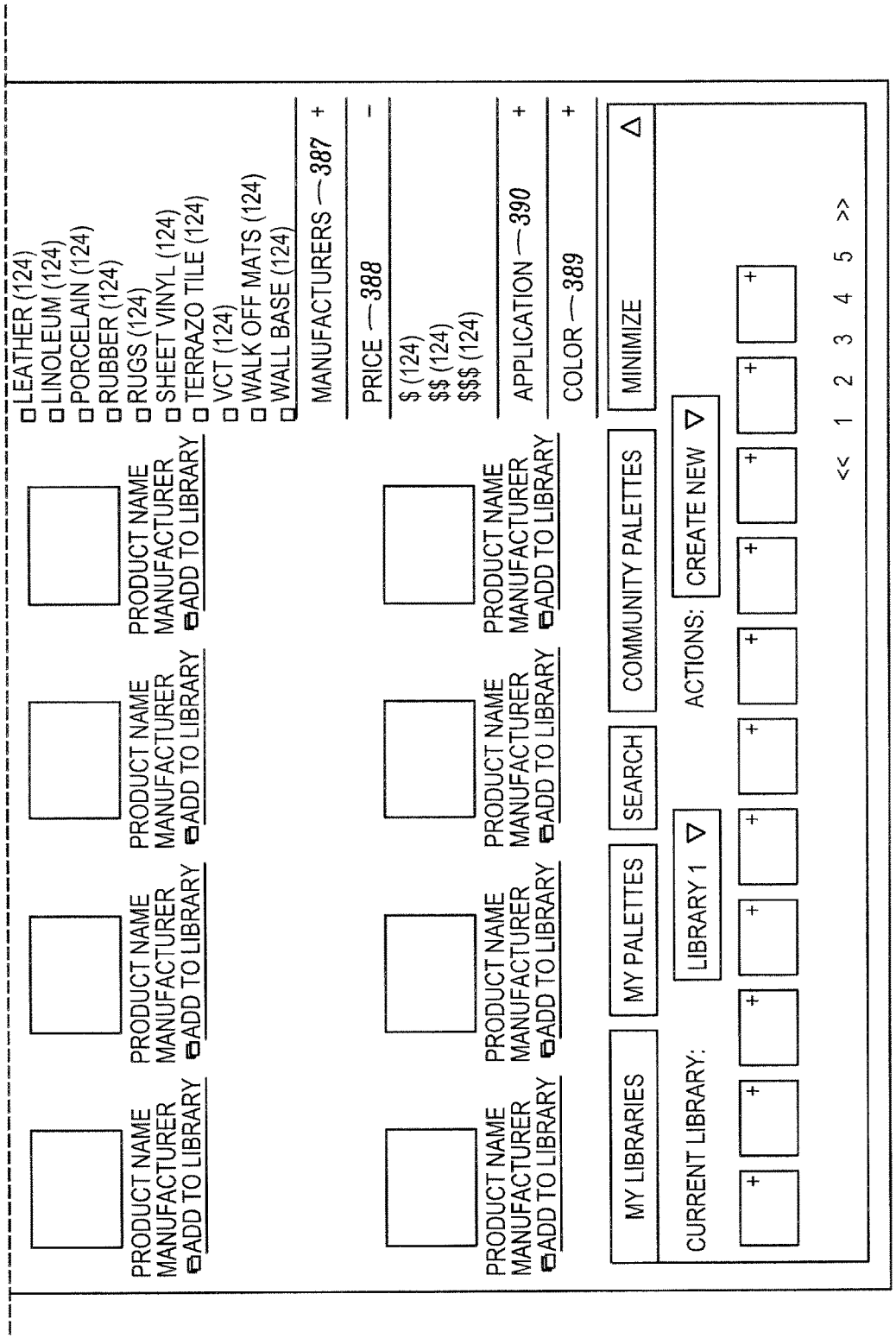

The user can search or view the different types of products offered on the website by clicking on the products tab 345. FIG. 6a illustrates an exemplary webpage that includes a products window 369 representing the different groups of products 370 (e.g., flooring, tiling, hardware, metals, wall finishing etc.), a new products window 371, and a product categories window 372. Some of these categories of product include various subcategories (e.g., tiling—ceramic, porcelain, mosaic etc.; fabric—cloth, leather, panel fabric, etc.). The user can simply click on the desired product group 370 in order to view the selection of products. The products are stored in the products database 100. Additionally, as shown on FIG. 6b, the user can view a specific product and narrow a selected product group 370 by using the product type, manufacturer, price color, or application. Registered manufacturers can access the server 25, upload new products, and update the information on existing products. The manufacturers provide specific information (e.g., product data, specification sheet, etc.) and photos of each new product and receive a confirmation email from the system when a product image or information is uploaded to the products database 100 and is ready to be viewed by users 40. Most likely, each product group 375 will include large selection of products (e.g., 100-1000). Therefore, a user 40 will utilize the search button 352 to display a search page (FIG. 6c) in order to search various products by different manufacturers.

Figure 6C:
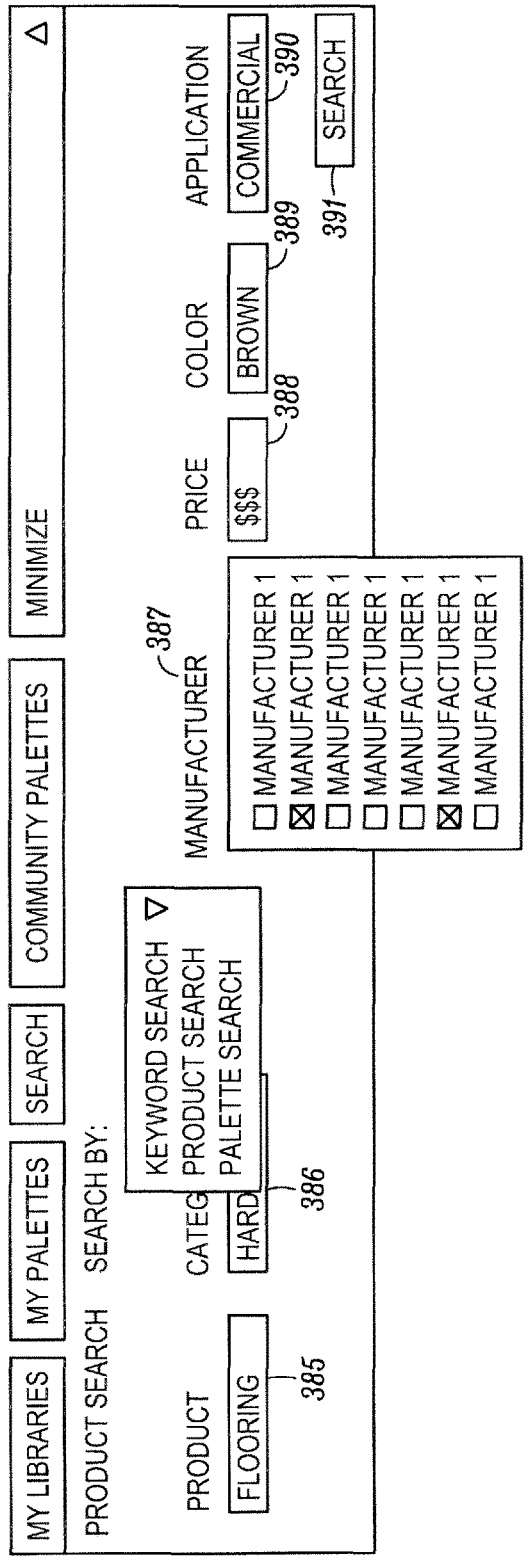
Figure 6C:
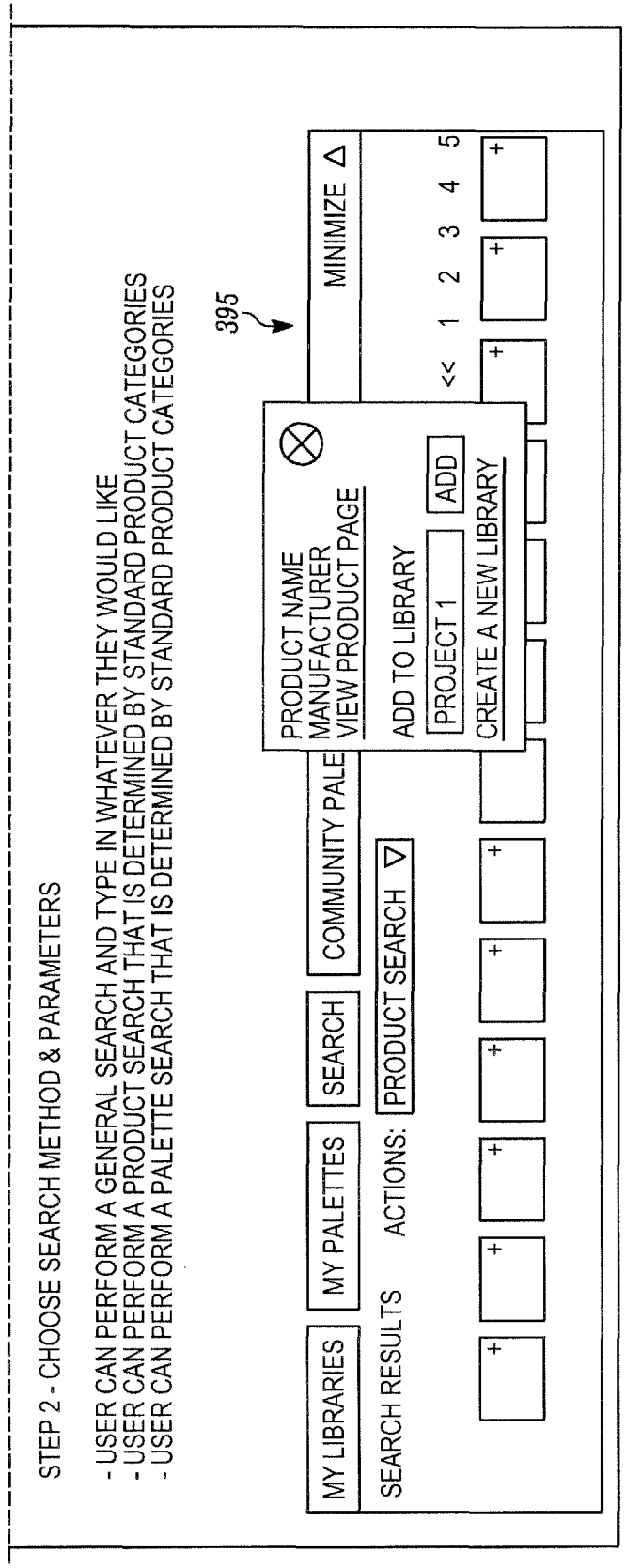

As shown in FIG. 6c, the search page allows a user 40 to browse, search, and view or preview specific products stored in the products database 100. For that reason the search page includes a product search window 380 and a product display window 395. In some implementations, the user inputs the product information in a product drop-down menu 385 (e.g., flooring) and specifies the specific product sub-category in the product category menu 386 (e.g., hardwood). In addition, the user can select a specific manufacturer from the manufacturer menu 387, price or price range for the product from the product price menu 388, product color from the color menu 389, and application (e.g., commercial, residential, etc.) from the application menu 390. In some implementations, the searchable data (e.g., products) are associated with keywords in their respective databases.

After entering the desired search criteria, the user commences the search by selecting the search button 39. The web browser 50 sends the search request to the server 25, which ensures that the search request is in the proper format, and forwards the request to the databases 30. The databases 30 receive the search request. In particular, the filtering module 65 searches the products database 100 based on the entered search criteria. The database 100 returns the results back to the server 25, which ensures that the results are in the proper format, and forwards the data to the web browser 50. The results from the search are displayed in the product display window 395. Upon selection of a particular product, the display window 395 provides a preview to the user of the selected product. If a user already has an e-palette 45, the user can add a product from the product display window 395 to that e-palette 45.

Figure 6D:
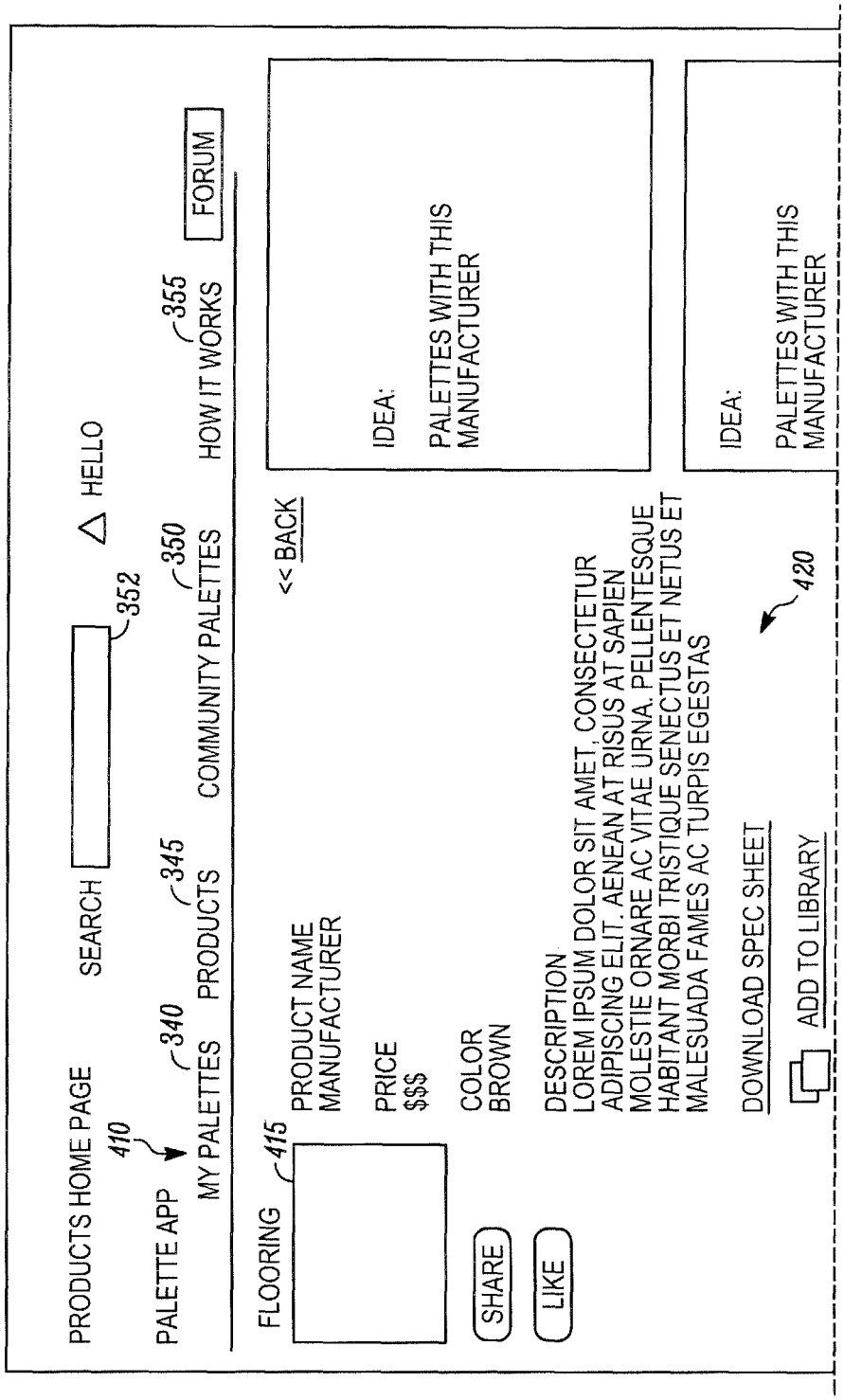
Figure 6D:
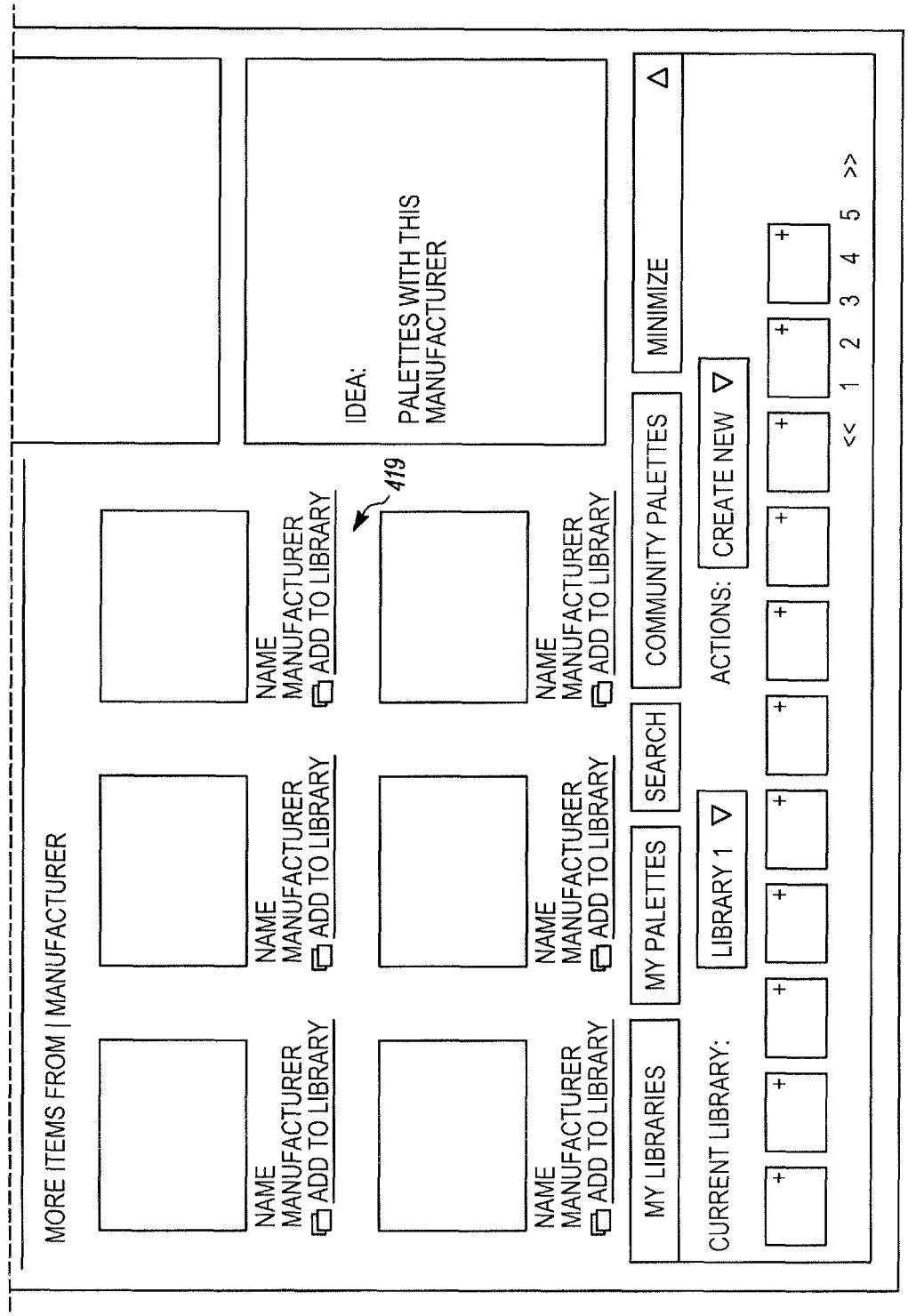

In addition, a product can be viewed by opening a new webpage. FIG. 6d shows product detail page 410 that includes a product image 415 and a product information window 420. The product detail webpage 410 can also include a "more items" window 419 that shows similar products from the same manufacturer. Further, a user can add one or more products to a user's library 400. For example, a user can create different libraries 400 for the different projects and product groups 375. In these libraries, the user can add e-palettes and products that he or she likes and wants to use in the future. The user 40 can delete a library or products within the library at any time.

Figure 6E:
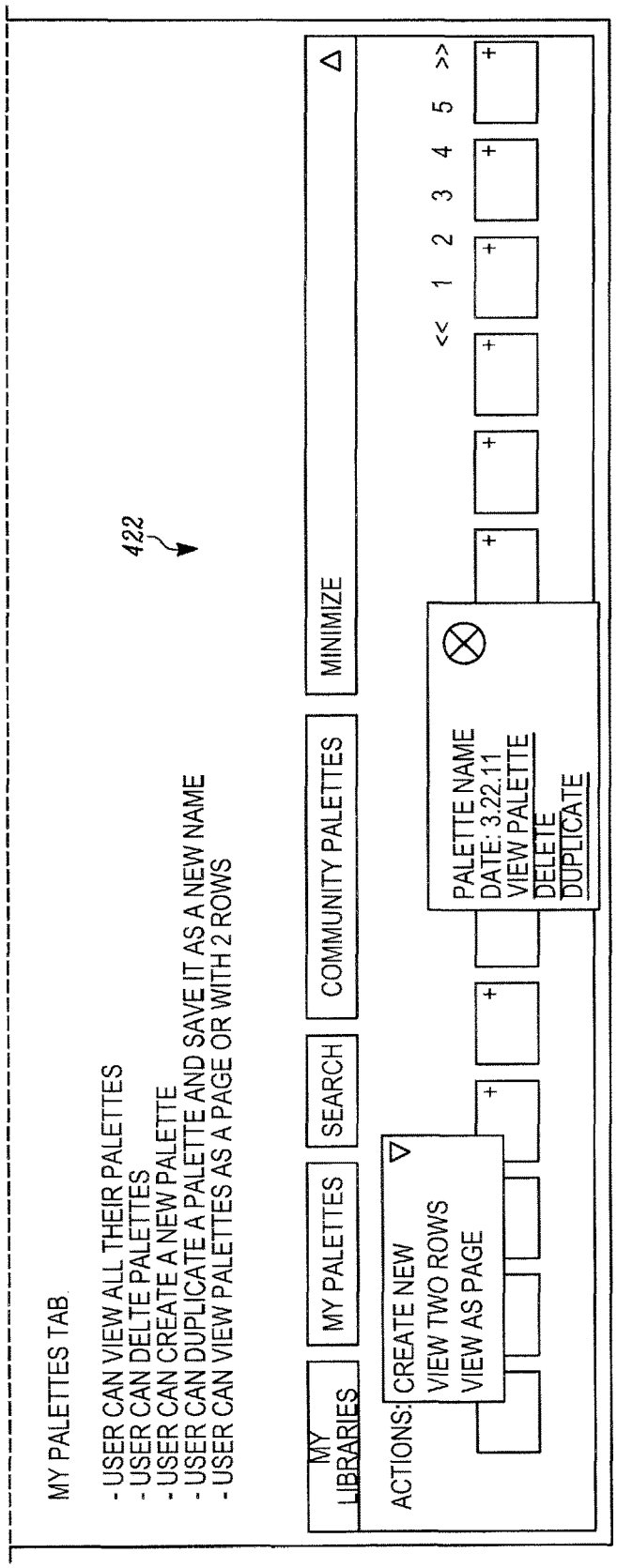

In one embodiment, a user can view and select from thousands of existing palettes saved in the e-palette database 90. A user can access the saved existing palette templates by clicking on the "community pallets" tab 350. As shown in FIG. 6e, the community palettes page includes a palette search window 421 and a palette display window 422. The palette search window 421 includes search menus 385-390 similar to the product search window 380. After the system 10 sorts the community palettes by using the filtering module 65, the user can view the community palettes in the palette display window 395. The user can select any of the exiting palettes and modify it according the specific needs of his or her projects. In some embodiments, the community palettes also include e-palettes that are created by other users and are publicly available.

Figure 6F:
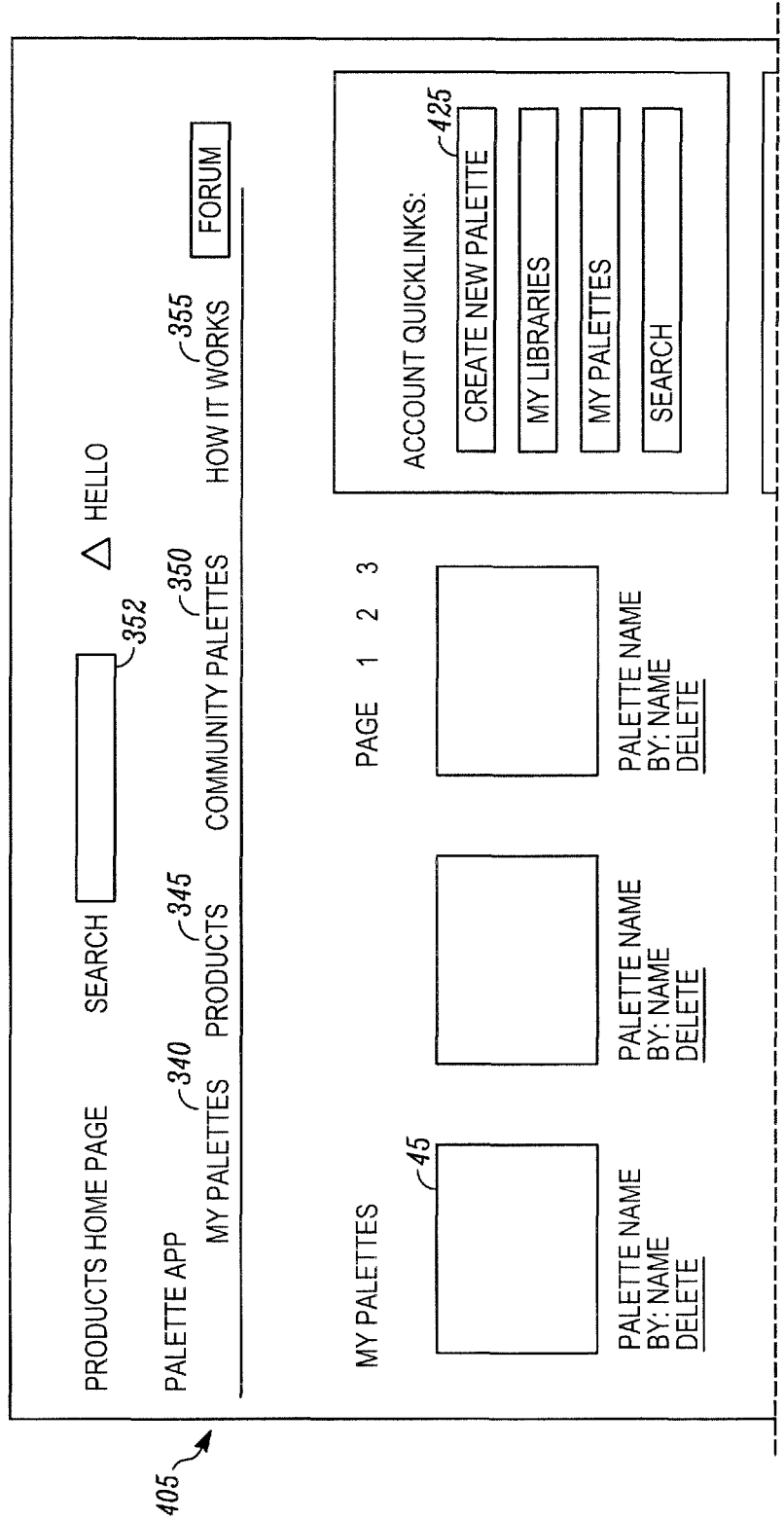
Figure 6F:
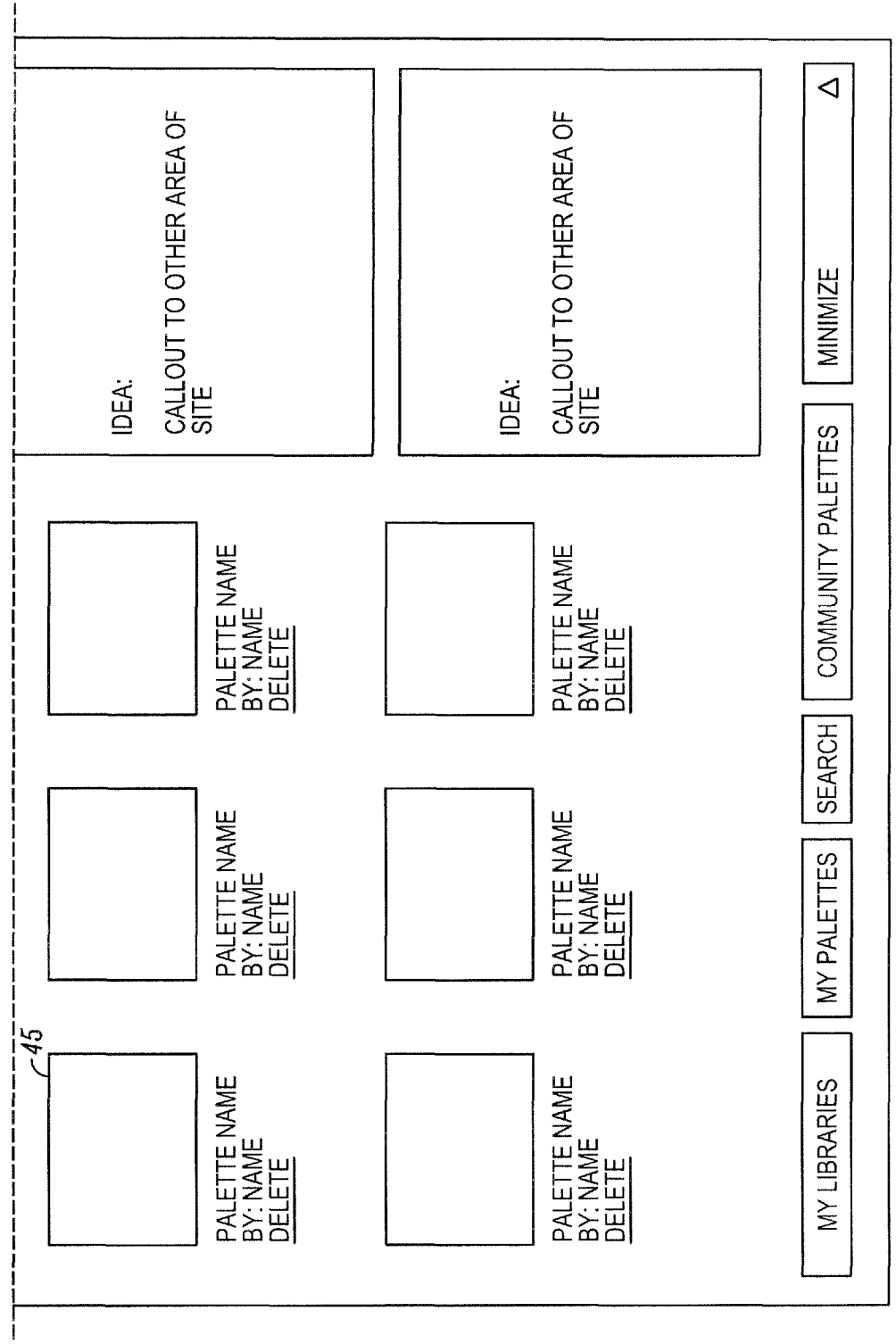
Figure 6G:
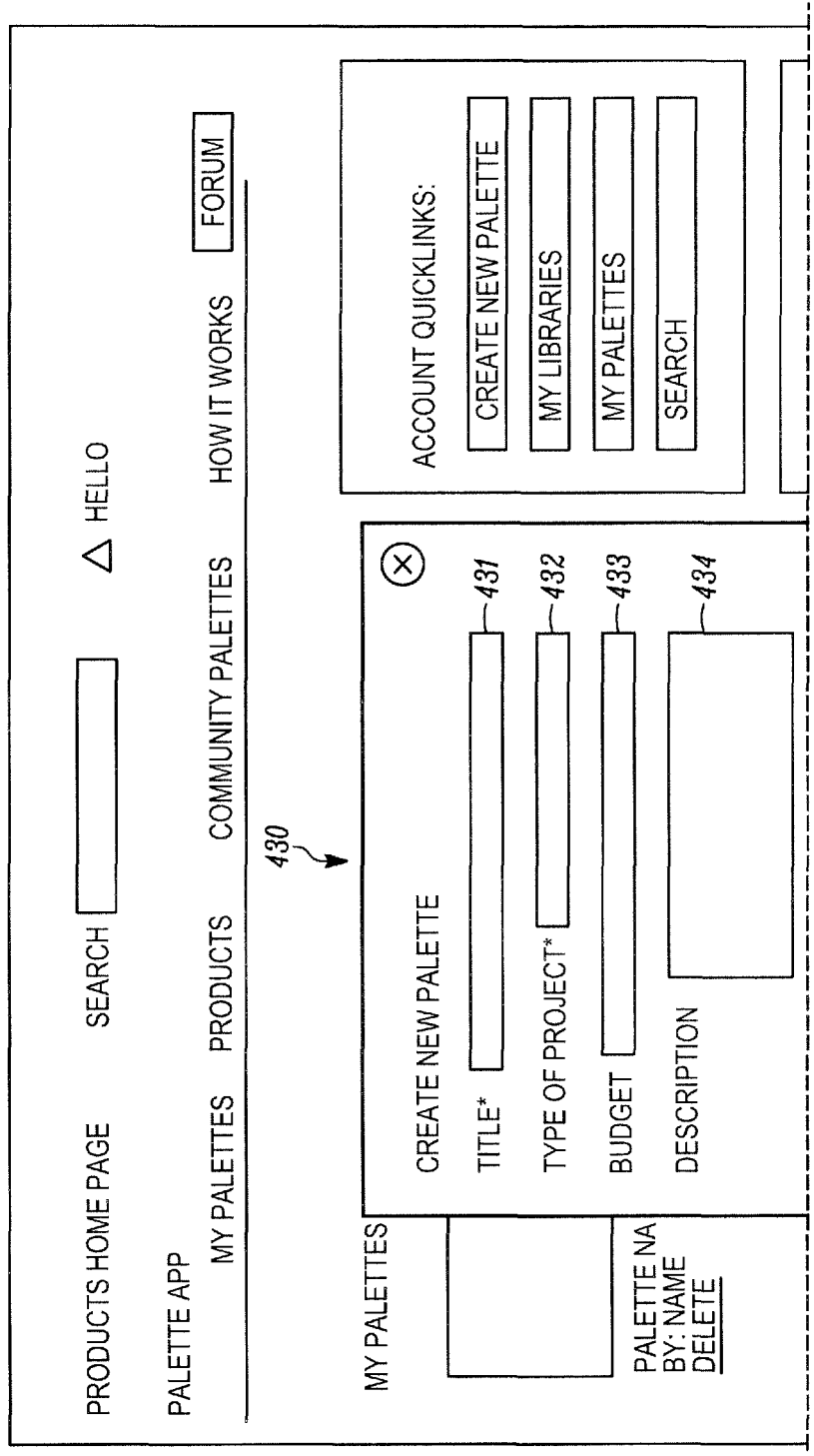
Figure 6G:
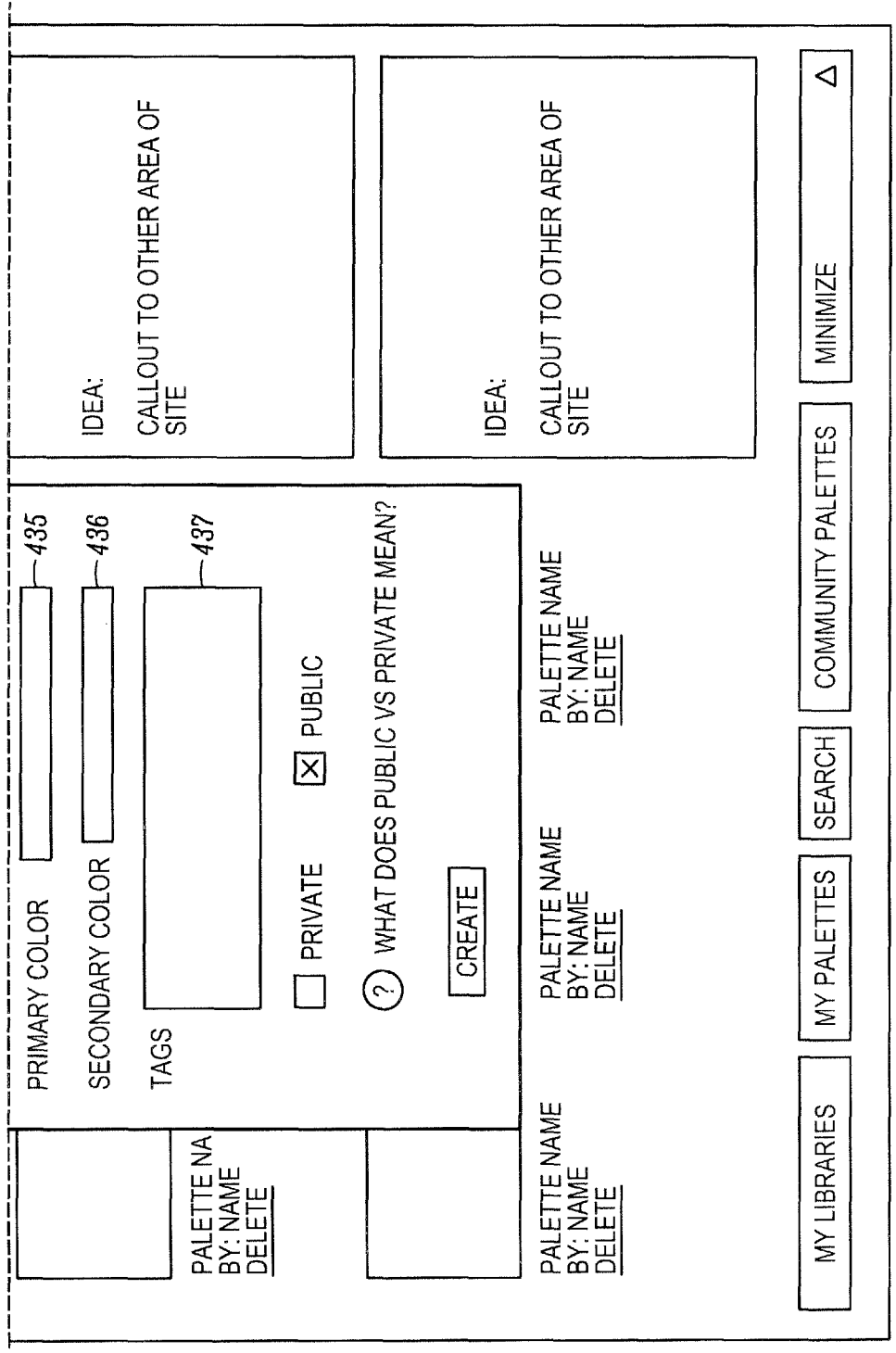

In order to view saved palettes or to create a new palette, the user clicks the "my palettes" button 340. On the "my palettes" page 405 (sec FIG. 6f), the user can see any previously created and saved palettes that are located in the palette libraries database 105. The user can open every palette, view the products in the palette, and add or remove products in the palette. Further, from the "my palettes" page, the user can delete existing palettes, or duplicate palettes and save them under a new name. In addition, the user can create a new palette 45. After clicking on the "create new palette" button 425 from the "my palettes" page 405, a new palette window 430 opens up. As shown in FIG. 6g, the user enters the required information in the following fields: title 431, type of project 432, budget 433, description, 434, primary color 435, secondary color 436, and tags 437. The user can specify whether the palette 45 is public or private.

In one embodiment, after inputting the palette information, the user is presented with e-palette template options. Based on the inputted palette information, the server 25 generates a list of suggested e-palette template options. The server 25 generates the list by using the received palette information to access the e-palette database 90. For example, the suggested list of e-palette templates can be displayed in the webpage or included in a drop-down menu. In some implementations, the webpage includes an e-palette preview window. When an c-palette template is selected from the user, a preview of the e-palette template is generated by the server 25 and displayed in the e-palette preview window. A user 40 may select an e-palette template and proceed to customization options by selecting a customize button.

The e-palette generating module 70 generates e-palettes for saving into the user's libraries or providing to a user computer 15. The e-palette generating module 70 receives the components to build an e-palette based on user selections via the e-palette website as described above, for instance, with respect to FIGS. 6 and 7*a-g*. A portion of the data received includes an e-palette template from the e-palette database 90. In some implementations, the template specifies the product groups 370 of the e-palette (e.g., flooring, fabric, hardware etc.), the specific products (carpet, laminate, cloth, leather), and the number of products for each product group (two carpets options, three fabric options, one glass option, etc.). In other implementations, the palette template includes only the product groups and a user 40 is able to modify the specific products, number of products, and other characteristics of the e-palette. The specific product associated with the e-palette template are sent from the products database 100 to the e-palette generating module 70, either by a specific request from the e-palette generating module 70 or automatically by the products database 100 upon selection of a template. The e-palette generating module 70 also receives recipient information and user specified details, such as palette title, type of project, and overriding information, sent from the user interface 15.

In some implementations, the designer user can modify a created e-palette 45 (during creation or after the palette is created) by adding products that are not stored in the products database 100. For that reason, the user uploads a product and saves it to the system 10 (e.g., in the products database 100). In order to upload a new product, the user must upload an image of the product and include information about the product (e.g., title, description, category, manufacturer, color, cost, etc.).

Figure 7:
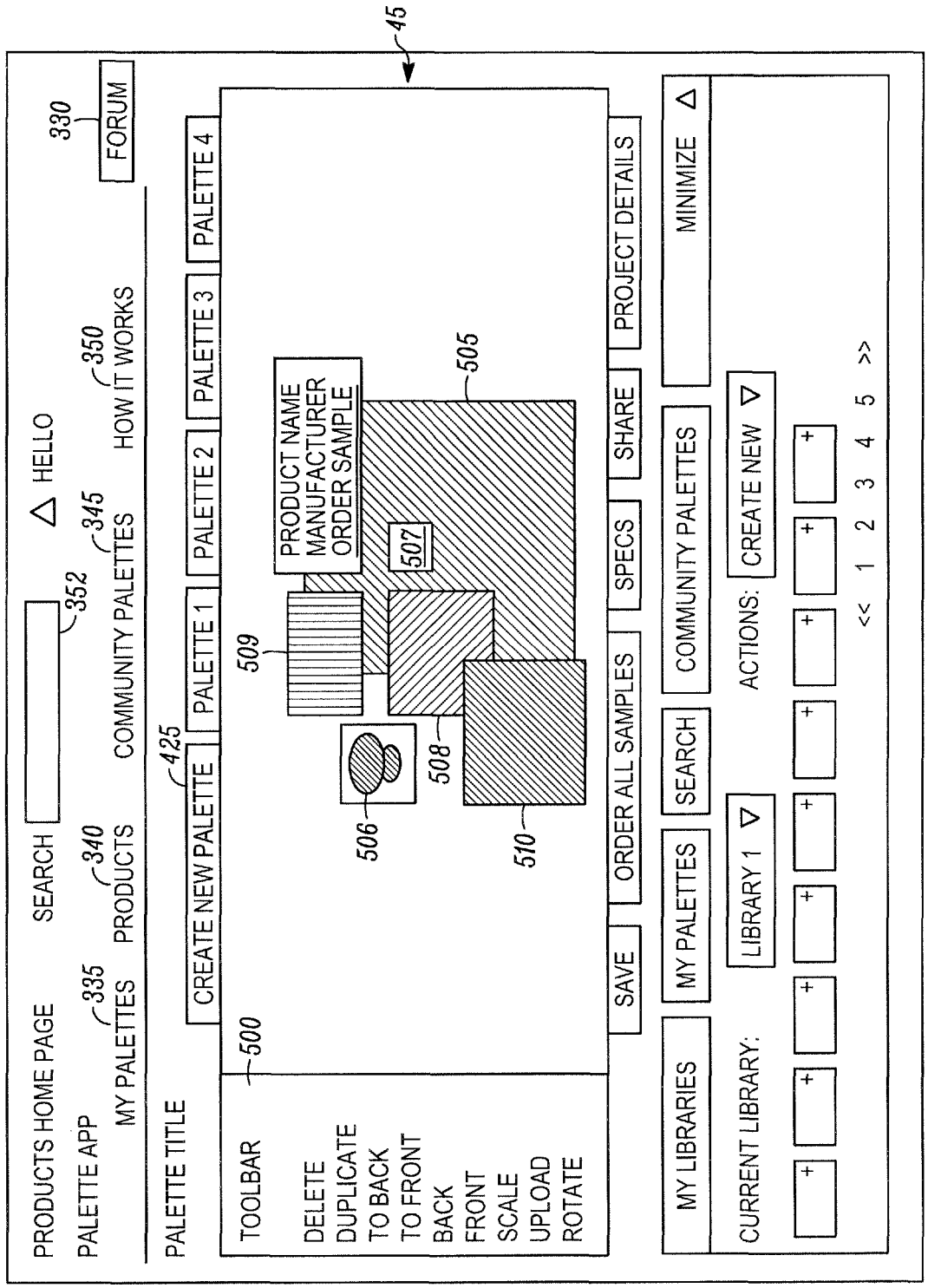
FIG. 7 depicts an electronic palette generated by the server of FIG. 2.

After receiving the information to generate the e-palette, the e-palette generating module 70 assembles the e-palette 45. An exemplary e-palette 45 is depicted in FIG. 7. The e-palette 45 includes image of various products (e.g., carpet 505, hardware, 506, colors 507-508, fabric 509, and laminate 510). By using the toolbar 500, the user can further modify the e-palette 45 by adding, changing, or deleting products. The user can also delete or duplicate the created e-palette 45. Further, by using the palette action buttons 520, a user 40 can view product specifications, order samples of the products, share the palette, or view project details. In addition, the user 40 can move, layer, resize, and sort the product images displayed on the browser 50 in order to modify the palette 45.

Once the user is satisfied with the generated e-palette 45, the server 25 proceeds to save and/or deliver the palette 45 as requested by the user 40. Delivery method options include sending the e-palette 45 as an attachment (to an email address), downloading the e-palette 45 to a user computer 15, or posting it to a social networking website.

Upon receipt of the e-palette 45, a user 40 views the e-palette 45 via an e-palette reader (e.g., a web browser, specific email application, or other html interpreting device) and a display (e.g., a monitor). The user 40 is also able to save the attached e-palette in a local memory of the user's receiving device, e.g., a hard drive of the user's computer. Thereafter, the attached e-palette 45 is operable to be opened by the user without a connection to the Internet 20, since the file is stored on a local memory device.

In some embodiments, the user 40 receives an e-palette 45 on a mobile computing device, a mobile phone, tablet computer, laptop, netbooks, etc. In some embodiments, an e-palette is sent as a text message (e.g, a multimedia message ("MMS")).

Figure 8:
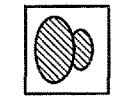
FIG. 8 is an order samples webpage of the exemplary electronic palette website generated by the server of FIG. 2.

In one implementation, the user 40 can order samples for the products included in the created e-palette 45 from the system 10. When the user clicks on the order samples button 525, an "order samples" window 600 opens up. As shown in FIG. 8, the user 40 can select a shipping address from the drop-down menu 605 or enter a new shipping address. The user can also select the shipping method (e.g., overnight, ground, etc.). When the user hits the submit button 610, the communication module 80 sends an email to all manufacturers of the products included in the palette 45. The email includes information about the requested sample(s), address of the receiving party, and the specified delivery method. A record of each sample order is stored into the orders database 121 for tracking purposes, manufacturer invoicing, and reporting. Of course, the user 40 can also order product samples for individual products that are not included in the palette 45 by following a similar procedure and requesting samples from manufacturers via the e-palette website.

If a product sample cannot be ordered or delivered (e.g., manufacturers can restrict certain users from ordering samples), the system 10 sends an email to the user 40 including the contact information of the manufacturer. In one implementation, when the user is a manufacturer or a representative, the user will be able to only display products for the specified manufacturer that they work for.

Although the invention is described for use with a user interface 15 and with a web browser 50, in some embodiments, a user interacts with the server 25 as described above using a mobile device, in-store kiosk, or other electronic device with either a web browser 50 or an e-palette software application being executed thereon. For instance, in some embodiments, a user navigates the e-palette website using a mobile computing device using either a web browser or a specific e-palette application that facilitates e-palette generation as described herein.

The invention claimed is:

1. A system for generating a design palette over a network, the system comprising:
   a database storing design product data for a plurality of design products, the design product data including manufacturer contact information for each of the plurality of design products;
   a processor; and
   a non-transitory computer-readable medium storing instructions that, when executed by the system, cause the system to:
      receive, from a user device, a selection of a subset of the design products for a first design project, wherein the subset of the design products is associated with a plurality of manufacturers;
      generate a design palette including the subset of design products;
      receive, from the user device, a request to order physical samples of the subset of design products;
      retrieve, from the database, the manufacturing contact information for each design product in the subset of the design products; and
      transmit, to each manufacturer in the plurality of manufacturers using the manufacturing contact information for each design product in the subset of the design products, a request for physical samples corresponding to the selection of the subset of the design products,
         wherein the request to each manufacturer is transmitted in response to the request from the user device, and
         wherein the request to each manufacturer comprises an identifier of a design product associated with the manufacturer in the subset of design products and a shipping address for the manufacturer to ship the design product.

2. The system of claim 1, wherein the instructions, when executed by the system, further cause the system to:
generate graphical representations of each design product in the subset of the design products; and
transmit, to the user device for display in a user interface, the graphical representations.

3. The system of claim 1, wherein the instructions, when executed by the system, further cause the system to download the design product data downloaded.

4. The system of claim 1, wherein the instructions, when executed by the system, further cause the system to:
receive a request for product specification sheets for each design product in the design palette.

5. The system of claim 1, wherein the instructions, when executed by the system, further cause the system to:
update, in response to receiving a request from a user interface on the user device to add or delete a design product from the design palette, the subset of design products; and
generate new graphical representations the design products currently in the subset of design products for display to on the user device.

6. The system of claim 1, wherein the instructions, when executed by the system, further cause the system to:
receive a request to generate a project binder for the design palette to use for the first design project; and
generate the project binder for the first design project containing a portion of the design product data for each design product in the design palette.

7. A method for generating a design palette over a network, the method comprising:
storing design product data related to a plurality of categories of at least one of commercial or residential products from a plurality of manufacturers, the design product data including manufacturer contact information for the at least one of commercial or residential products;
receiving a user selection of a first design product from a first category of at least one of commercial or residential products and a second user selection of a second design product from a second category of at least one of commercial or residential products;
generating a graphical representation of a design palette containing the first and second design products for display on a user interface;
receiving a request for a first physical sample of the first design product and a second physical sample of the second design product;
transmitting, to a first manufacturer of the first design product based on the manufacturer contact information, an order for the first physical sample of the first design product, wherein the order for the first physical sample comprises an identifier for the first physical sample and a shipping address for the first manufacturer to ship the first physical sample; and
transmitting, to a second manufacturer of the second design product based on the manufacturer contact information, an order for the second physical sample of the second design product, wherein the order for the second physical sample comprises an identifier for the second physical sample and a shipping address for the second manufacturer to ship the second physical sample.

8. The method of claim 7, further comprising:
allowing a user access to a palette library database comprising the design palettes created by the other users; and
receiving a modification from the user to at least one design palette in the palette library database.

9. The method of claim 7, further comprising allowing a user to move, layer, resize, or sort images of the first and second design products to further facilitate user comparison of similarities and differences of product features of the first and second design products.

10. The method of claim 7, further comprising transmitting the design palette to a user device for display alongside an interactive graphical element that allows a user to access specification sheets for each design product currently included in the design palette.

11. The method of claim 10, further comprising allowing a user device to download the specification sheets for each design product currently included in the design palette by clicking the interactive graphical element.

12. The method of claim 7, further comprising transmitting the design palette to a user device for display alongside an interactive graphical element that allows a user to order samples of each design product currently included in the design palette,
wherein the user receives a specification sheet for each design product currently included in the design palette automatically upon submitting a samples order for a design palette.

13. The method of claim 7, further comprising transmitting the design palette to a user device for display alongside an interactive graphical element that allows a user to create or download a project binder for the design palette that may be used for planning commercial design projects,
wherein the project binder contains a plurality of a cover page, an index page, a product page, a specification sheet, an installation sheet, a maintenance sheet, a warranty sheet, or a material safety data sheet for each design product currently included in the design palette.

14. The method of claim 7, wherein the request for the first physical sample of the first design product and the second physical sample of the second design product is submitted through a user interface of a user device, the method further comprising; and
processing user payments for the request.

15. The method of claim 7, further comprising:
collecting data for user orders of samples, user requests for design features, and user activity; and
generating design product suggestions for the user based on the collected data.

16. The method of claim 15, wherein images of each suggested design product are displayed at a user interface of a user device while the user is browsing the design products to select desired commercial or residential products from desired manufacturers so that the user may compare features of the suggested design products with currently displayed design products.

17. The method of claim 15, wherein images of each of suggested design product are displayed on a user interface of a user device alongside the images of the first and second design products to facilitate user comparison of product features of the suggested design products with the product features of the first and second design products.

* * * * *